United States Patent
Rashidy et al.

(10) Patent No.: US 7,246,845 B2
(45) Date of Patent: Jul. 24, 2007

(54) STRUCTURAL SEAT SYSTEM FOR AN AUTOMOTIVE VEHICLE

(75) Inventors: Mostafa Rashidy, Bloomfield, MI (US); George A. Corder, Romulus, MI (US); Robert G. Store, Rochester Hills, MI (US); James E. Robertson, Rochester, MI (US); George Wolenter, Dearborn Heights, MI (US)

(73) Assignee: ASC Incorporated, Southgate, MI (US)

( * ) Notice: Subject to any disclaimer, the term of this patent is extended or adjusted under 35 U.S.C. 154(b) by 197 days.

(21) Appl. No.: 11/021,595

(22) Filed: Dec. 23, 2004

(65) Prior Publication Data
US 2005/0161967 A1 Jul. 28, 2005

Related U.S. Application Data

(63) Continuation-in-part of application No. 10/979,873, filed on Nov. 2, 2004, and a continuation-in-part of application No. 10/822,901, filed on Apr. 13, 2004.

(60) Provisional application No. 60/499,669, filed on Sep. 3, 2003.

(51) Int. Cl.
*B62D 25/20* (2006.01)
*B60N 2/02* (2006.01)

(52) U.S. Cl. ............... 296/187.12; 296/193.02; 297/284.4; 297/354.12

(58) Field of Classification Search ......... 296/193.02, 296/187.05, 187.12, 187.08, 68.1; 297/284.4, 297/284.7, 354.12, 378.12, 463.2
See application file for complete search history.

(56) References Cited

U.S. PATENT DOCUMENTS

| 1,463,193 | A | | 7/1923 | Botella |
| 1,694,546 | A | | 12/1928 | Lancia |
| 1,794,465 | A | | 3/1931 | Ledwinka |
| 1,797,989 | A | | 3/1931 | Ledwinka |
| 2,079,232 | A | * | 5/1937 | Smith .................. 296/116 |
| 2,370,211 | A | | 2/1945 | Ulrich |
| 2,597,837 | A | | 5/1952 | Lindsay |
| 2,751,247 | A | | 6/1956 | Barenyi |
| 3,021,172 | A | | 2/1962 | Fiala et al. |

(Continued)

FOREIGN PATENT DOCUMENTS

AU 655 926 B 1/1996

(Continued)

OTHER PUBLICATIONS

Photographs of 1942 Rolls-Royce, "Duchess" Fleetwood seda with stationary roof (believed to have been offered for sale or publicly used in 1942).

(Continued)

*Primary Examiner*—Joseph D. Pape
(74) *Attorney, Agent, or Firm*—Harness, Dickey & Pierce, P.L.C.

(57) ABSTRACT

A structural seat system is provided for an automotive vehicle. In another aspect of the present invention, a structural beam is employed which extends in a cross-vehicle direction spaced above a vehicle floor. A further aspect of the present invention provides a passenger seat with a recessed configuration. Yet another aspect of the present invention uses a structural reinforcement and seat system in a convertible roof vehicle.

23 Claims, 21 Drawing Sheets

U.S. PATENT DOCUMENTS

| | | | |
|---|---|---|---|
| 3,328,935 A | 7/1967 | Peras | |
| 3,944,276 A | 3/1976 | de Rosa et al. | |
| 4,230,361 A | 10/1980 | Nachbur et al. | |
| 4,231,607 A | 11/1980 | Bohlin | |
| 4,346,930 A | 8/1982 | Northey | |
| 4,493,506 A | 1/1985 | Alexander | |
| 4,514,891 A | 5/1985 | Draper | |
| 4,570,321 A | 2/1986 | Draper | |
| 4,613,184 A | 9/1986 | Rispeter et al. | |
| 4,660,345 A | 4/1987 | Browning | |
| 4,662,052 A | 5/1987 | Draper | |
| 4,729,156 A | 3/1988 | Norris, Jr. et al. | |
| 4,892,350 A | 1/1990 | Kijima | |
| 4,934,751 A | 6/1990 | Shimoda | |
| 4,940,282 A | 7/1990 | Townsend | |
| 4,944,553 A | 7/1990 | Medley et al. | |
| 4,950,026 A | 8/1990 | Emmons | |
| 4,968,087 A | 11/1990 | Goria | |
| 5,018,780 A | 5/1991 | Yoshii et al. | |
| 5,020,846 A | 6/1991 | Bonnett | |
| 5,094,478 A | 3/1992 | Pfanzeder et al. | |
| 5,110,176 A | 5/1992 | Curtis | |
| 5,238,286 A | 8/1993 | Tanaka et al. | |
| 5,255,487 A | 10/1993 | Wieting et al. | |
| 5,351,400 A | 10/1994 | Samuel | |
| 5,388,885 A | 2/1995 | Warren | |
| 5,435,618 A | 7/1995 | Sacco et al. | |
| 5,575,531 A | 11/1996 | Gauger et al. | |
| 5,577,796 A | 11/1996 | Clausen | |
| 5,577,797 A | 11/1996 | Takanishi | |
| 5,584,525 A | 12/1996 | Nakano et al. | |
| 5,613,727 A | 3/1997 | Yamazaki | |
| 5,641,193 A | 6/1997 | Zepnik et al. | |
| 5,641,194 A | 6/1997 | Honma et al. | |
| 5,772,274 A | 6/1998 | Tokarz | |
| 5,788,322 A | 8/1998 | Wolf et al. | |
| 5,803,533 A | 9/1998 | Schulz et al. | |
| 5,806,918 A | 9/1998 | Kanazawa | |
| 5,868,426 A | 2/1999 | Edwards et al. | |
| 5,881,458 A | 3/1999 | Wolf et al. | |
| 5,921,618 A | 7/1999 | Mori et al. | |
| 5,954,390 A | 9/1999 | Kleinhoffer et al. | |
| 5,988,734 A | 11/1999 | Longo et al. | |
| 5,992,921 A | 11/1999 | Seki | |
| 5,997,078 A | 12/1999 | Beck et al. | |
| 6,007,145 A | 12/1999 | Tezuka | |
| 6,039,386 A | 3/2000 | Hasshi et al. | |
| 6,053,567 A | 4/2000 | Ito | |
| 6,126,232 A | 10/2000 | Nakano | |
| 6,139,082 A | 10/2000 | Davis, Jr. et al. | |
| 6,168,228 B1 | 1/2001 | Heinz et al. | |
| 6,176,544 B1 | 1/2001 | Seksaria et al. | |
| 6,189,952 B1 | 2/2001 | Schmidt et al. | |
| 6,220,654 B1 | 4/2001 | Sommer | |
| 6,237,991 B1 | 5/2001 | Weber | |
| 6,270,153 B1 | 8/2001 | Toyao et al. | |
| 6,273,498 B1 | 8/2001 | Hillman et al. | |
| 6,296,301 B1 | 10/2001 | Schroeder et al. | |
| 6,299,238 B1 | 10/2001 | Takagi et al. | |
| 6,299,239 B1 | 10/2001 | Sagawa et al. | |
| 6,299,240 B1 | 10/2001 | Schroeder et al. | |
| 6,315,353 B1 | 11/2001 | Brodt et al. | |
| 6,332,643 B1 | 12/2001 | Sukegawa et al. | |
| 6,334,643 B1 * | 1/2002 | Lindblad et al. | 296/65.09 |
| 6,382,710 B1 | 5/2002 | Funk et al. | |
| 6,398,292 B2 | 6/2002 | Tsuruta et al. | |
| 6,434,907 B1 | 8/2002 | Simboli | |
| 6,443,517 B1 | 9/2002 | Just et al. | |
| 6,443,518 B1 | 9/2002 | Rohl et al. | |
| 6,491,337 B2 | 12/2002 | Averdick et al. | |
| 6,540,286 B2 | 4/2003 | Takemoto et al. | |
| 6,568,745 B2 | 5/2003 | Kosuge et al. | |
| 6,572,181 B2 | 6/2003 | Jonsson | |
| 6,578,903 B2 | 6/2003 | Ernst et al. | |
| 6,604,781 B2 | 8/2003 | Uchida | |
| 6,644,725 B2 | 11/2003 | Braitmaier et al. | |
| 6,655,729 B2 | 12/2003 | Neale | |
| 6,666,500 B2 | 12/2003 | Polzer et al. | |
| 6,679,546 B2 | 1/2004 | Mishima et al. | |
| 6,688,677 B2 | 2/2004 | Glashagel et al. | |
| 6,820,913 B2 * | 11/2004 | Macey et al. | 296/65.13 |
| 6,857,692 B2 | 2/2005 | Cardimen et al. | |
| 6,869,132 B2 | 3/2005 | Wang et al. | |
| 2001/0019216 A1 | 9/2001 | Kobayashi | |
| 2001/0045759 A1 | 11/2001 | Russke | |
| 2002/0057004 A1 | 5/2002 | Corcoran et al. | |
| 2002/0089225 A1 | 7/2002 | Bruck et al. | |
| 2002/0145307 A1 | 10/2002 | Fujita | |
| 2002/0153749 A1 | 10/2002 | Lee | |
| 2002/0163225 A1 | 11/2002 | Glashagel et al. | |
| 2002/0195840 A1 | 12/2002 | Mishima et al. | |
| 2003/0006629 A1 | 1/2003 | Kimura et al. | |
| 2003/0034671 A1 | 2/2003 | Streiff et al. | |
| 2003/0038498 A1 | 2/2003 | Rajasingham | |
| 2003/0062742 A1 | 4/2003 | Neale | |
| 2003/0209929 A1 * | 11/2003 | Muin et al. | 297/331 |
| 2004/0222658 A1 | 11/2004 | Dilluvio | |
| 2005/0057077 A1 | 3/2005 | Telehowski et al. | |

FOREIGN PATENT DOCUMENTS

| | | |
|---|---|---|
| CA | 2 403 319 | 3/2003 |
| DE | 32 34 305 | 3/1984 |
| DE | 196 03 098 A1 | 7/1997 |
| DE | 199 16 849 | 10/2000 |
| EP | 0 059 147 | 5/1985 |
| EP | 1 151 882 | 11/2001 |
| FR | 459931 | 11/1913 |
| FR | 671743 | 12/1929 |
| FR | 2 120 326 A | 8/1972 |
| GB | 273894 | 7/1927 |
| GB | 612015 | 11/1948 |
| JP | 6-99851 | 4/1994 |
| JP | 11-115662 | 4/1999 |
| WO | WO 02/096675 | 12/2002 |

OTHER PUBLICATIONS

Photographs of 1931 Series 355 7-passenger touring vehicle with convertible roof and four doors (believed to have been offered for sale or publicly used in 1931).

Photos and description of Kennedy Presidential Limousine (publicly used in 1960s).

G. Guzzardi and E. Rizzo, Convertibles-History and Evolution of Dream Cars (1998), 38 pages.

Two photographs of 2005 Ford 500.

Photograph of Rolls Royce (publicly used or published in 1956).

Photographs of Lincoln Continental Limousine (publicly used or published prior to 2003).

Photographs of metal structure for 2005 model year Ford 500 (2 pages).

Mark Vaughn, "Chrysler 300C Cabriolet", (Newport Convertible Engineering, Inc.), Nov. 22, 2004, AutoWeek, p. 4.

"Drop-top Rolls", Nov. 22, 2004, AutoWeek, p. 4.

European Search Report dated Jul. 12, 2005.

European Search Report dated Jul. 28, 2005.

Byron Bloch, Advanced Designs for Side Impact and Rollover Protection, 1988 15 pages.

* cited by examiner

STRUCTURAL SEAT SYSTEM FOR AN AUTOMOTIVE VEHICLE

CROSS-REFERENCE TO RELATED APPLICATIONS

This application is a continuation-in-part of copending U.S. Ser. No. 10/979,873, filed on Nov. 2, 2004, and copending U.S. Ser. No. 10/822,901, filed on Apr. 13, 2004, which claims the benefit of U.S. Provisional Application No. 60/499,669, filed on Sep. 3, 2003. The disclosures of the above applications are incorporated by reference herein.

BACKGROUND AND SUMMARY OF THE INVENTION

The present invention generally relates to automotive vehicles and more particularly to a structural reinforcement and seat system for an automotive vehicle.

Cross-vehicle body stiffness within automotive vehicles is important in reducing torsional twist and vibration of the body, but also improves the ride and handling of the vehicle. This issue is especially important for convertible vehicles where the removal of the traditional fixed roof structure further decreases vehicle stiffness to the point where four door convertible roof vehicles have been essentially impractical to achieve with conventional body structure. Furthermore, U.S. Federal Motor Vehicle Safety Standard ("FMVSS") 214 relates to side impact collision protection for vehicles. This governmental standard employs a moving barrier, equivalent to a truck bumper, which impacts the vehicle generally at and below a belt-line of the front door and B-pillar. FMVSS 214 puts an added premium on cross-vehicle stiffness.

U.S. Pat. No. 1,694,546 entitled "Motor Car," which issued to Lancia on Dec. 11, 1928, and U.S. Pat. No. 5,788,322 entitled "Body Structure for a Rear Carriage of a Convertible," which issued to Wolf et al. on Aug. 4, 1998, have both attempted to provide some cross-vehicle structure. It is noteworthy, however, that both constructions are attached to a fixed seat back and/or passenger compartment panel. Furthermore, the Lancia construction appears to lack any cross-vehicle structural support that would significantly resist side impacts or torsion, especially for a modern unibody construction vehicle. U.S. Pat. No. 5,954,390, entitled "Vehicle Dynamic Side Impact System" which issued to Kleinhoffer et al. on Sep. 21, 1999, discloses a seat mounting track and seat affixed on top of a beam. This device, however, appears to use an undesirably high seat or ineffectively low beam; moreover, a fixed roof is employed in this patent as an added structural reinforcement.

In accordance with the present invention, a structural seat system is provided for an automotive vehicle. In another aspect of the present invention, a structural beam is employed which extends in a cross-vehicle direction spaced above a vehicle floor. A further aspect of the present invention provides a passenger seat with a recessed configuration. A variety of structural beam-to-seat mounting arrangements and positions are also provided in additional aspects of the present invention. Yet another aspect of the present invention uses a structural reinforcement and seat system in a convertible roof vehicle.

The present invention is advantageous over conventional constructions, in that the present invention significantly improves cross-vehicle resistance to side impact collisions and provides torsional stiffness sufficient for use with a large four door vehicle, such as one having a convertible roof. Spacing the structural beam away from the floor reduces "match boxing" of the vehicle body and more direct side impact resistance as compared to traditional, floor mounted reinforcements. Moreover, the beam-to-pillar mounting structures of the present invention significantly enhance side impact resistance as compared to prior constructions. The seat structure and positioning of the present invention allows for normal reclining and seat movement while still providing a raised structural reinforcement system. Additional features and advantages of the present invention will be shown and described with reference to the following description and appended figures.

DETAILED DESCRIPTION OF THE PREFERRED EMBODIMENT

Figure 1:
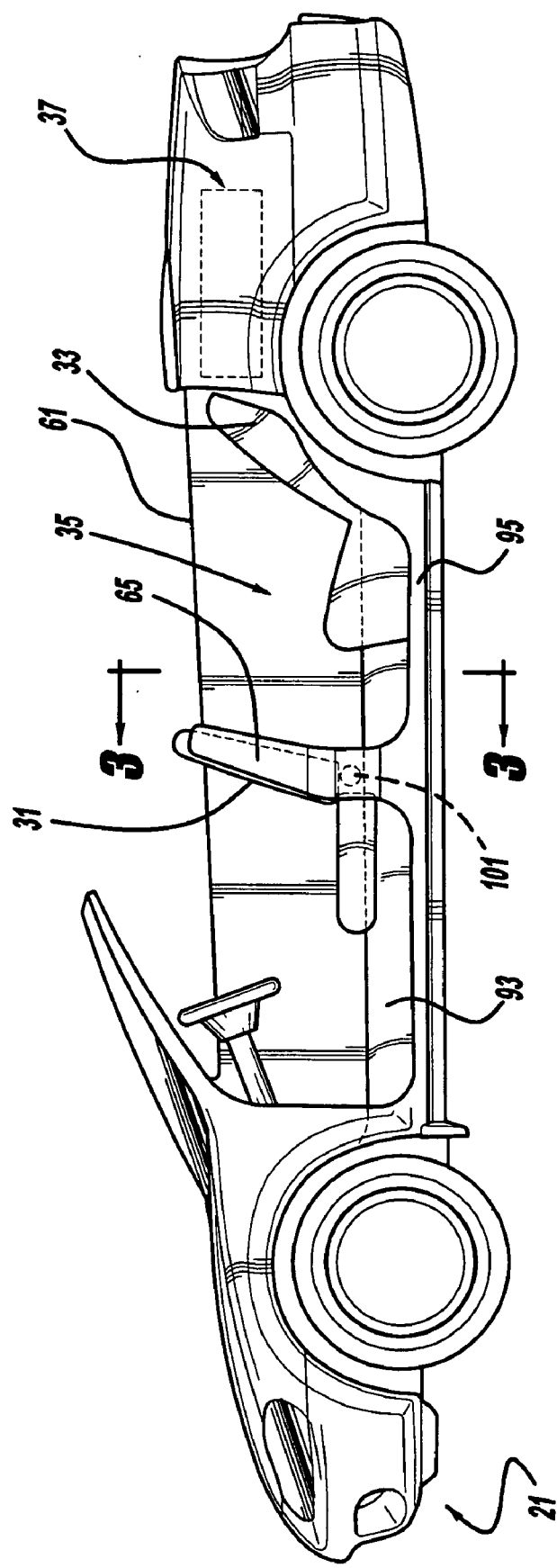
FIG. 1 is a side elevational view showing a preferred embodiment system of the present invention, with a convertible roof in a retracted position and with the left side doors removed.
Figure 2:
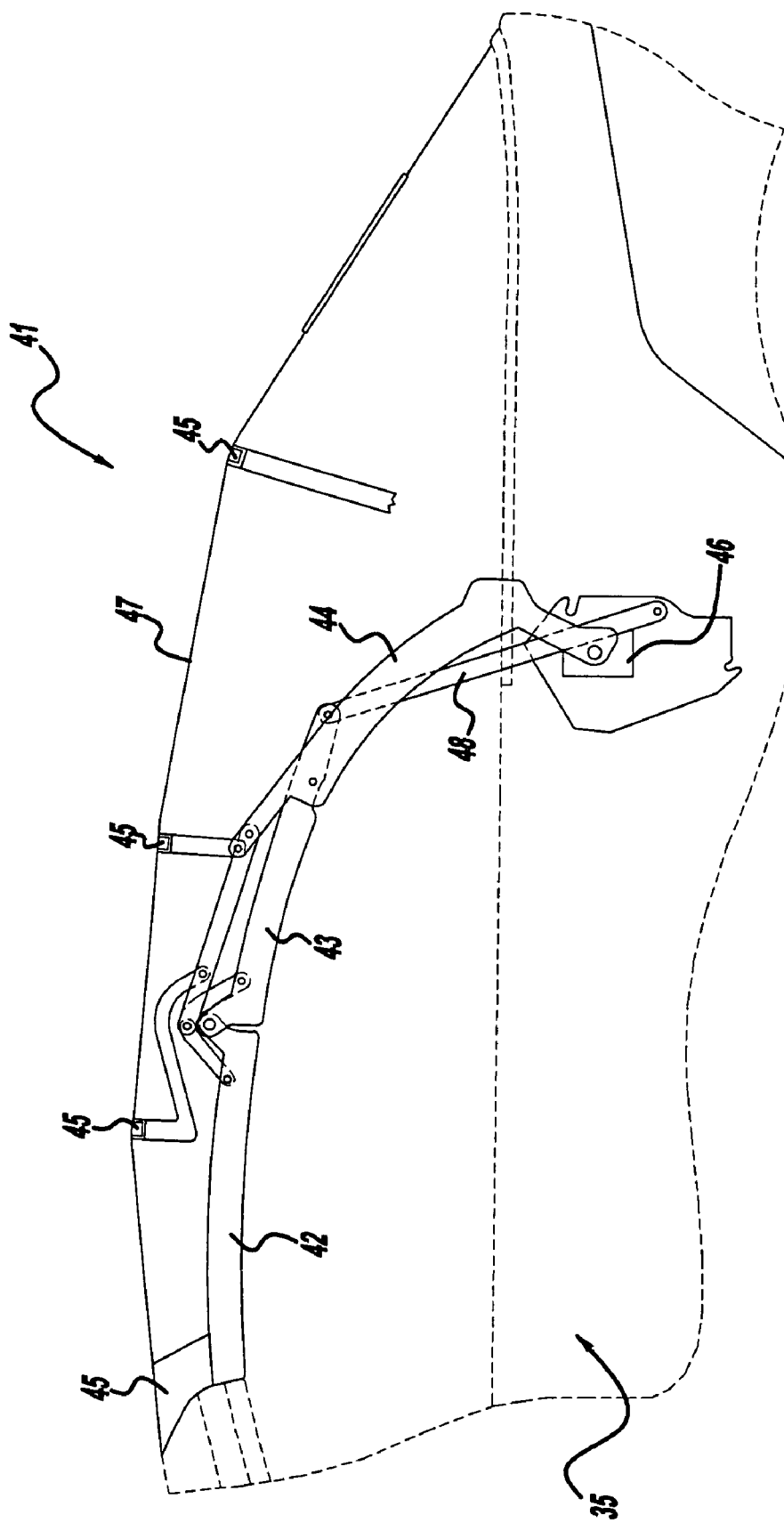
FIG. 2 is a diagrammatic side view showing a convertible roof, usable with the present invention, disposed in a raised position.

An automotive vehicle according to the present invention has a body, a convertible roof and a structural reinforcement system 19. As shown in FIGS. 1 and 2, a vehicle 21 has soft top convertible roof 41 of the type disclosed in U.S. patent Ser. No. 10/403,362, now U.S. Pat. No. 6,695,385, entitled "Vehicle Convertible Roof," which was invented by Eric W. Lange and filed on Mar. 31, 2003; this disclosure is incorporated by reference herein. Soft top roof 41 includes a top stack mechanism including left and right, front, center and rear side rails, 42, 43 and 44, respectively, with four spanning roof bows 45 and multiple linkages 48. An electric motor or hydraulic actuator 46 automatically drives the mechanism and a pliable roof cover 47 is attached to and covers roof bows 45. The convertible roof is movable from a raised and closed position above front passenger seats 31 and rear passenger seats 33 in a passenger compartment 35, as shown in FIG. 2, to a retracted and open position within a roof storage compartment 37 predominantly below a vehicular beltline 61, as shown in FIG. 1. Roof storage compartment 32 is a trunk with a dual opening decklid, or a bootwall, forward and separated from a trunk, covered by an automatically openable tonneau cover. A more preferred convertible roof is described in U.S. Ser. No. 60/612,384, entitled "In-Folding Convertible Roof" which was filed on Sep. 23, 2004, and invented by Dilluvio; this application is incorporated by reference herein.

Alternately, a retractable hard-top roof (not shown) including a front hard-top section, a middle hard-top section and a rear hard-top section is employed. The hard-top sections are interconnected by a linkage assembly driven by an automatic actuator, such as an electric motor or hydraulic cylinder. Such a hard-top roof and linkage assembly is disclosed in U.S. patent Ser. No. 10/245,973, now U.S. Pat. No. 6,695,386, entitled "Vehicle Retractable Hardtop Roof," which was invented by Michael T. Willard and filed on Sep. 18, 2002, which is incorporated by reference herein. Furthermore, in another alternate variation (not shown), multiple sliding roof panels and a slidably retracting backlite or back window can be provided with the present invention. This variation is disclosed in PCT Publication No. WO 02/096685 entitled "Automotive Vehicle with Open Air System" which was invented by Doncov et al. and published on Dec. 5, 2002; this disclosure is also incorporated by reference herein.

Figure 3:
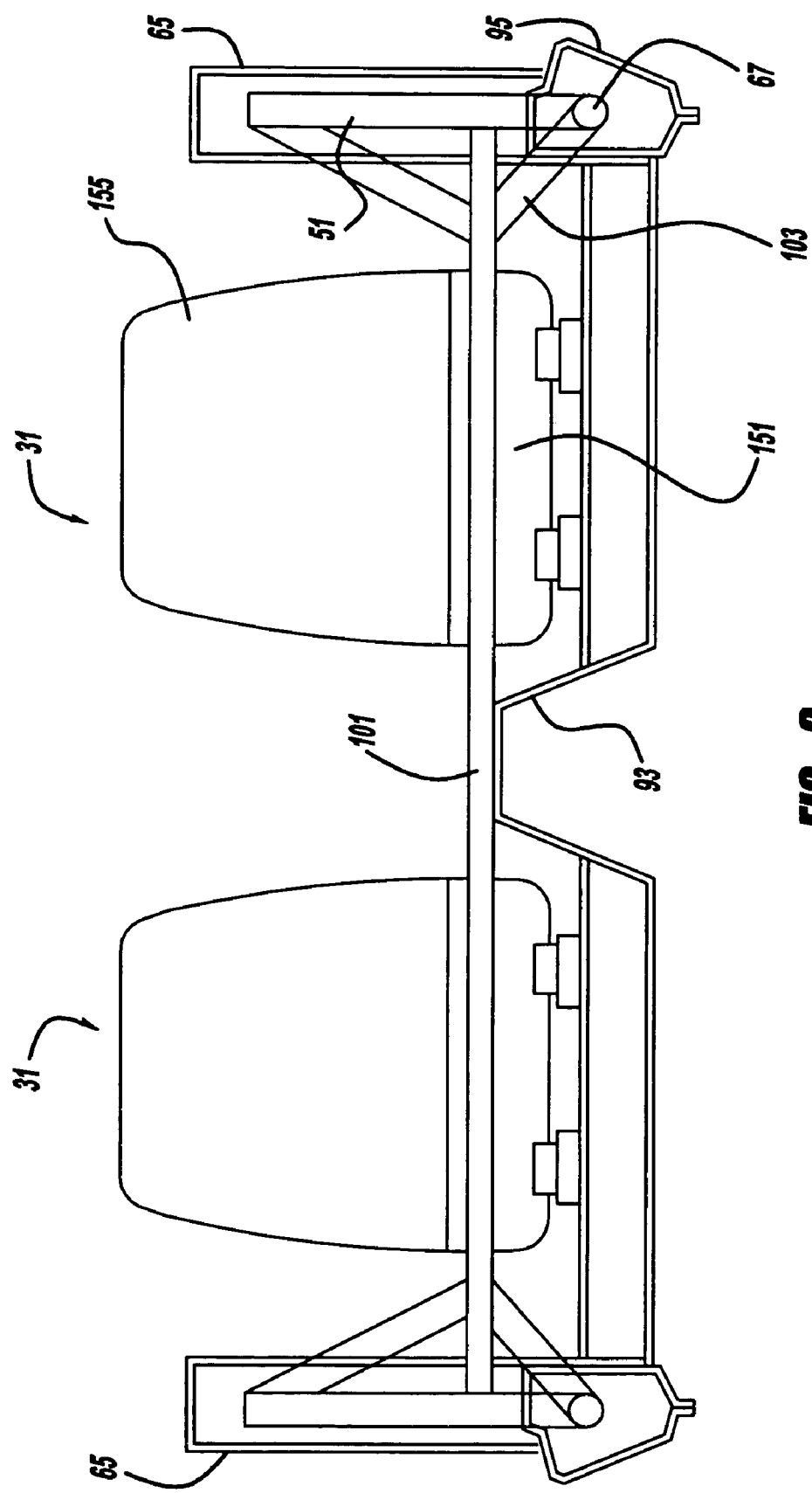
FIG. 3 is a diagrammatic rear view, taken along line 3-3 of FIG. 1, showing the preferred embodiment system, with an outer reinforcement removed.
Figure 4:
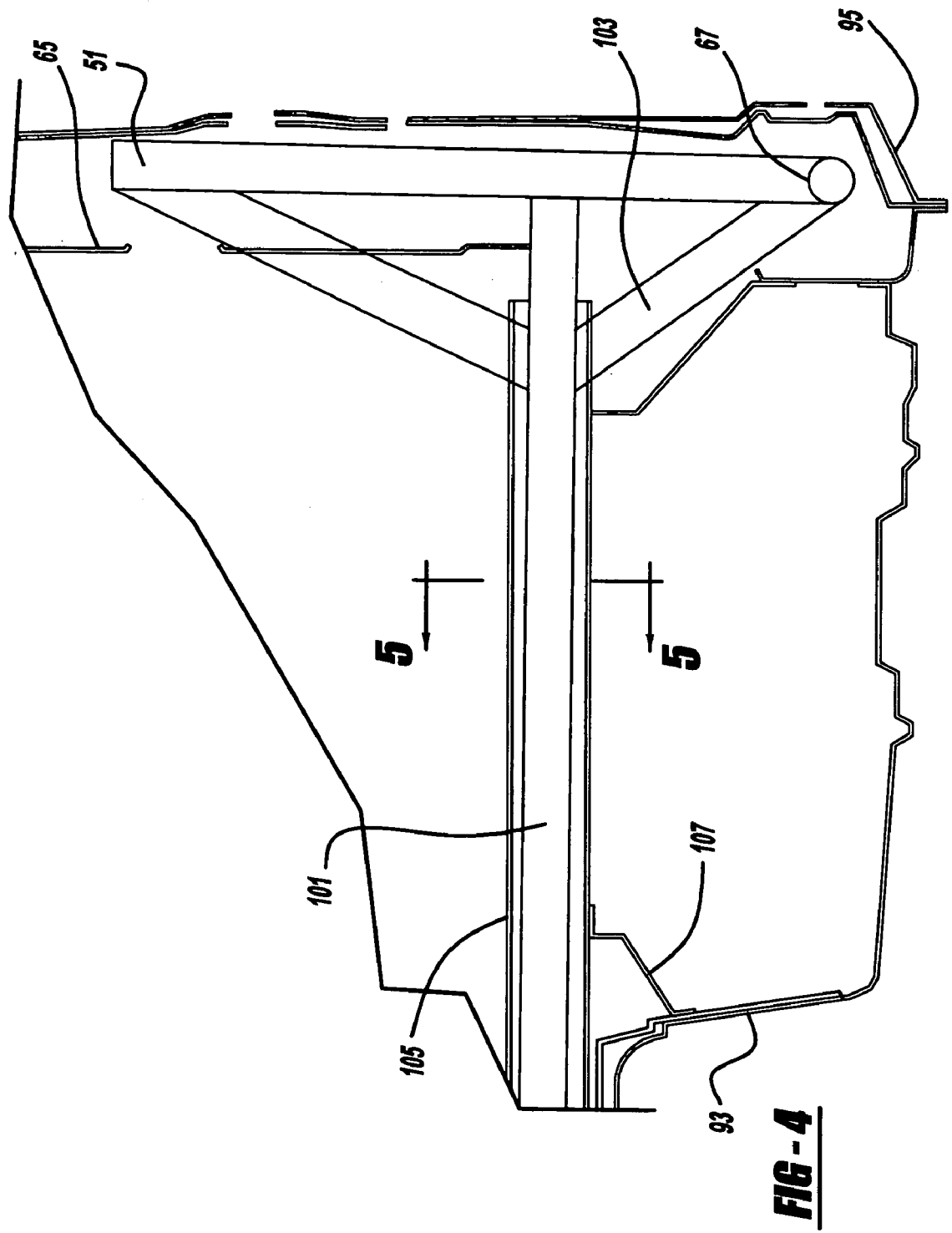
FIG. 4 is a fragmentary rear view showing a reinforcement structure of the preferred embodiment system.
Figure 5:
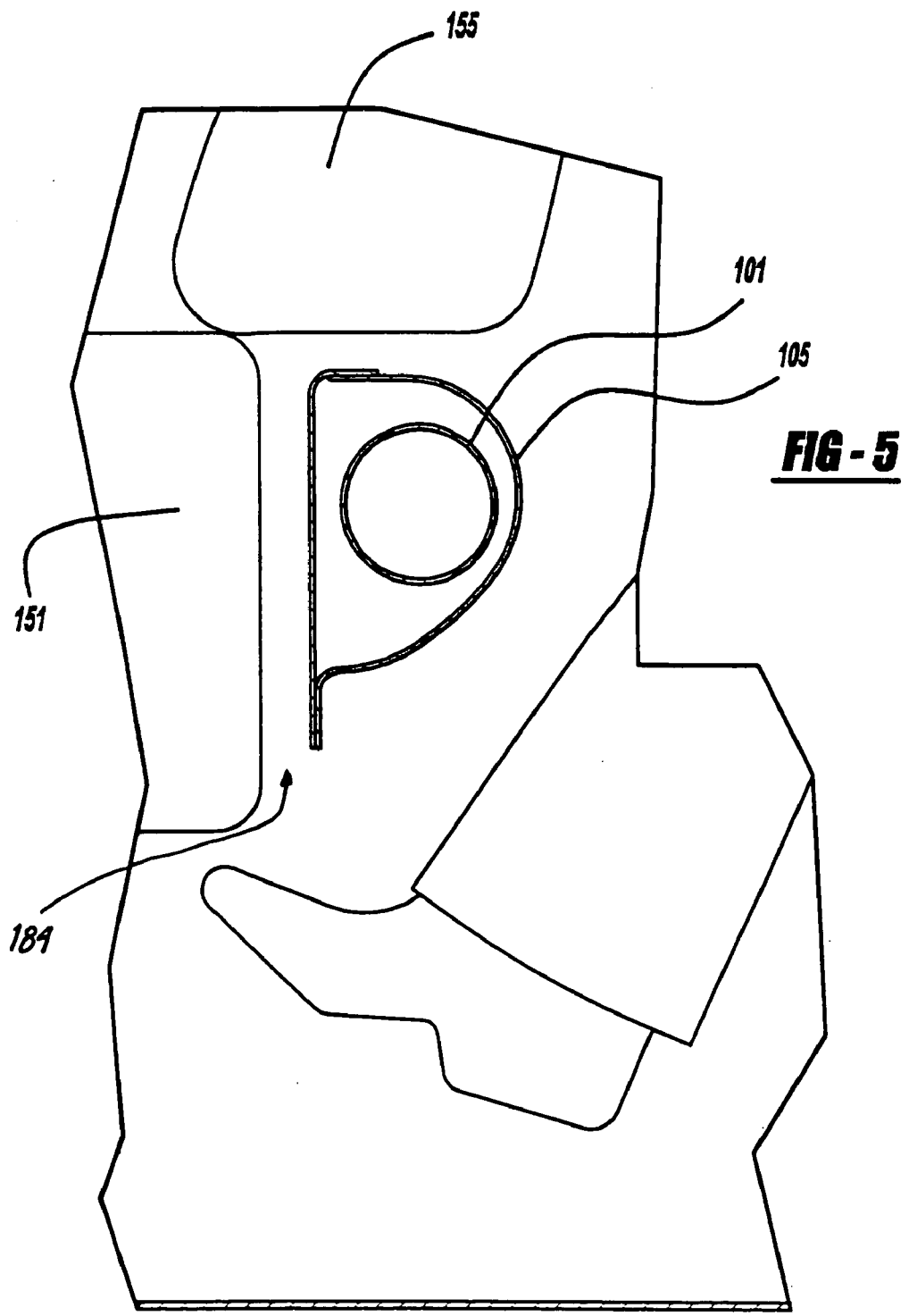
FIG. 5 is a cross-sectional view, taken along line 5-5 of FIG. 4, showing the preferred embodiment system.
Figure 6:
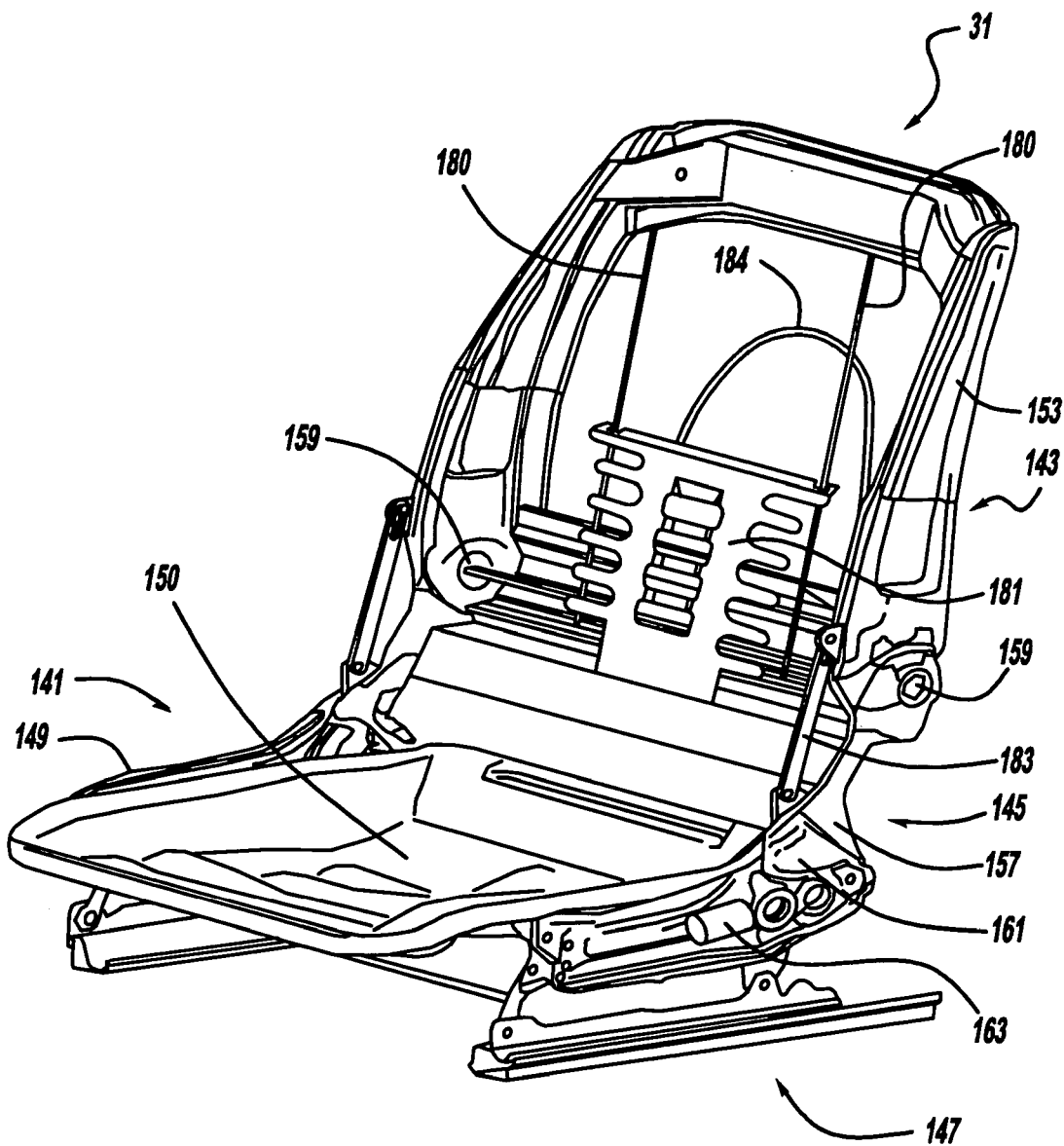
FIG. 6 is a front perspective view showing a front passenger seat of the preferred embodiment system.
Figure 7:
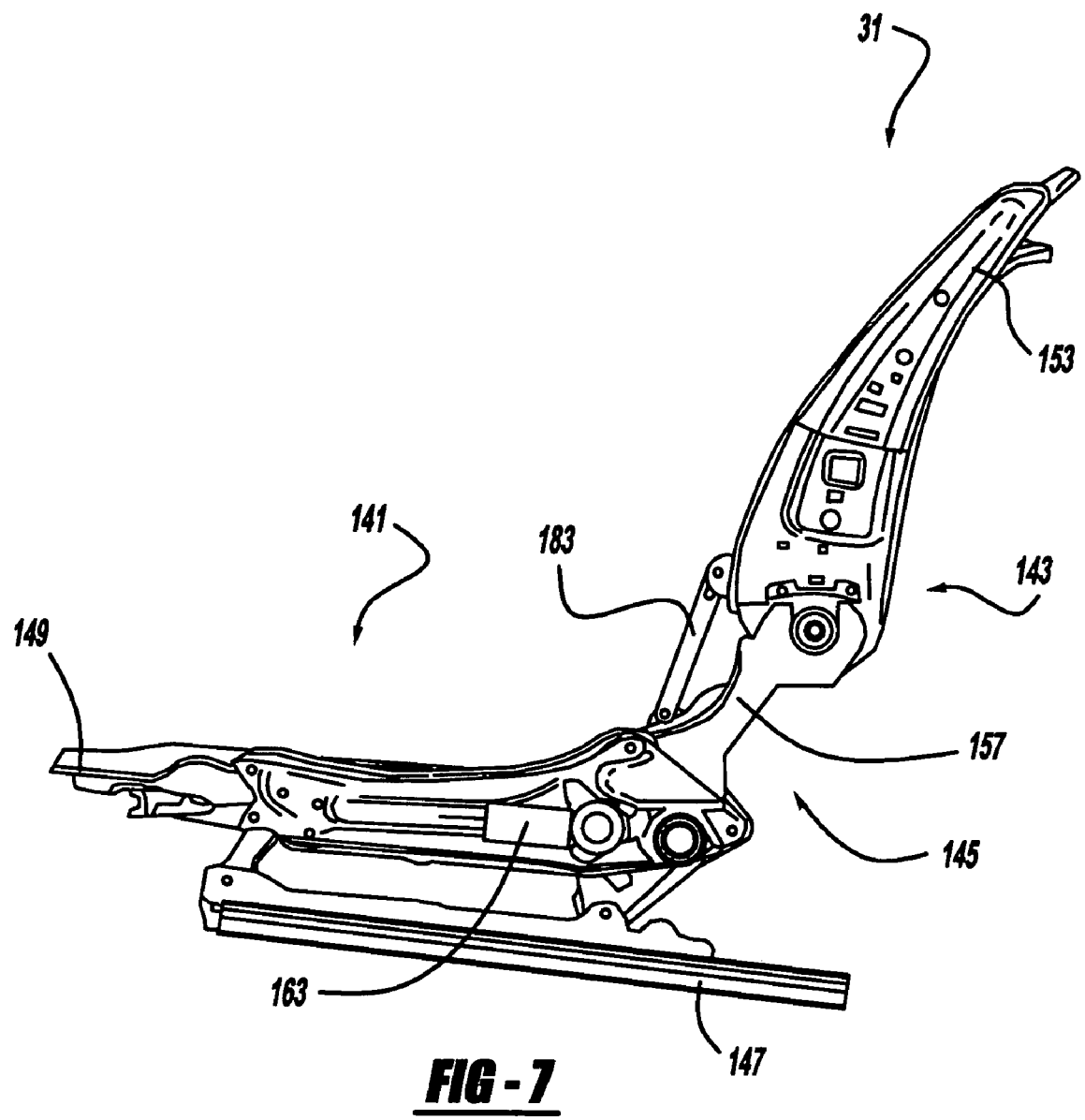
FIG. 7 is a side elevational view showing the seat of the preferred embodiment system.
Figure 8:
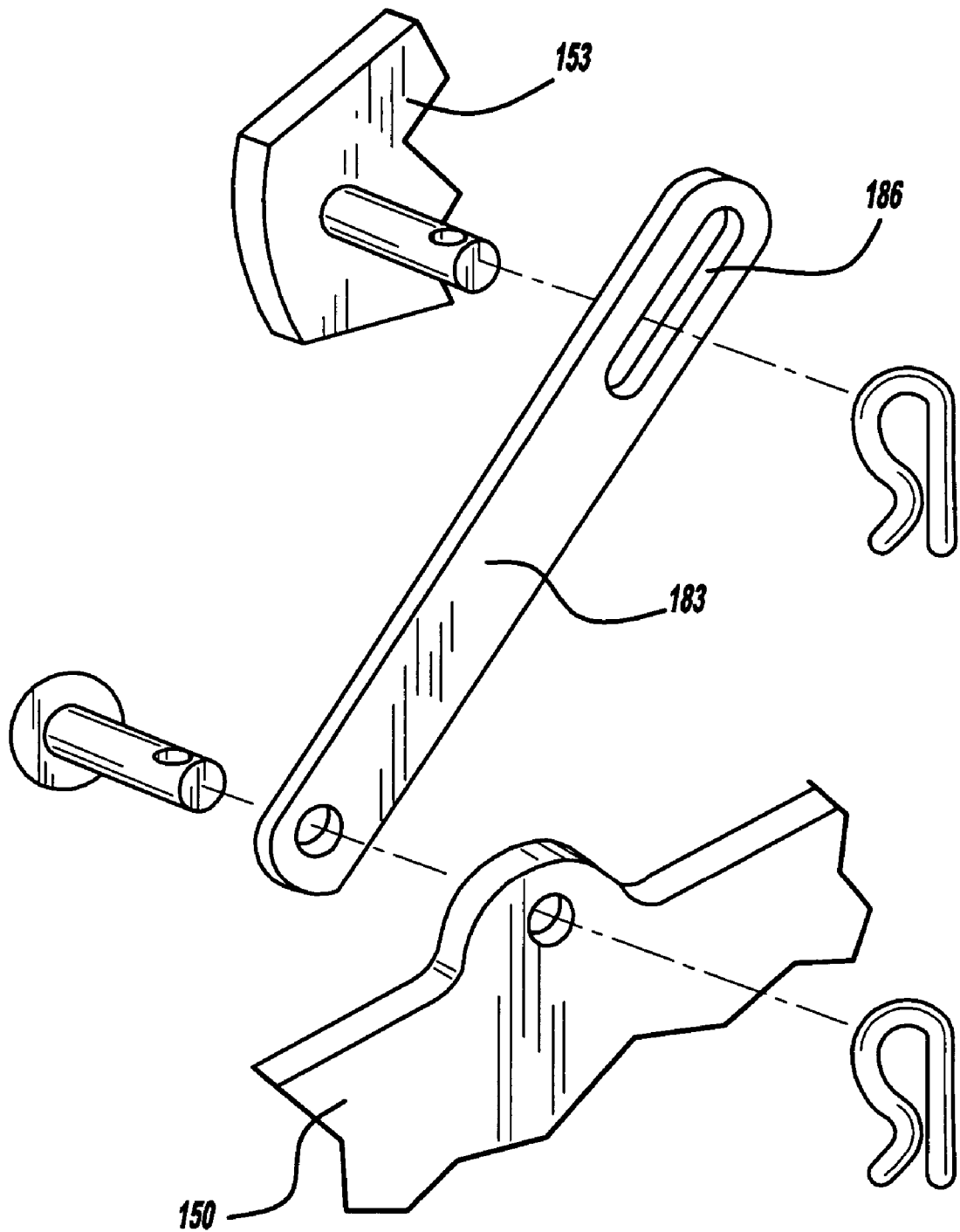
FIG. 8 is an exploded perspective view showing a lumbar support link employed in the preferred embodiment system.

Referring to FIGS. 3-5, a generally vertical, steel reinforcing tube 51 is welded within each center or B-pillar 65, and is attached to a generally fore-and-aft elongated and horizontal reinforcing steel tube 67 which is welded within each rocker panel 95. A structural reinforcement cross beam 101 is welded to a middle segment of vertical reinforcement tube 51 and is elongated in a generally straight, cross-vehicle and horizontal orientation projecting inwardly between B-pillars 65. Cross beam 101 is a structural steel tube. A lower diagonal reinforcement tube or beam 103 downwardly and outwardly extends from cross beam 101 and is welded to a lower segment of vertical reinforcement tube 51 and/or rocker reinforcement tube 67. Both B-pillar reinforcement systems are similarly constructed in mirrored symmetry to each other and are connected by the continuous or two part cross beam 101 welded or bolted to center tunnel 93.

A structural outer member or supplemental cross beam 105 is preferably shown as two stamped, steel parts that are welded or riveted together to encase or surround a majority of main cross beam 101 therein between B-pillars 65. Alternately, structural outer member 105 may consist of a circular-cylindrical tube or rectangular cross-sectionally shaped reinforcement surrounding cross beam 101, or may be entirely eliminated depending upon the specific vehicle application. Preferably, cross beam 101 is inwardly spaced from a majority of outer member 105, and outer member 105 is attached to B-pillars 65 and a floor tunnel 93 by diagonally extending, structural gusset covers 107. Structural outer member 105 serves to reinforce and limit buckling of the otherwise straight cross beam 101 during a side impact collision and to further stiffen the vehicle body between B-pillars 65 during extreme torsional operating forces of the vehicle.

The details of one of the preferred embodiment front passenger seats 31 are shown in FIGS. 6-10 with the other front seat being in mirrored symmetry. Seat 31 has a seat bottom 141, a seat back 143, an attached recliner mechanism 145 and a seat track mechanism 147. Seat bottom 141 includes a generally horizontal bottom frame 149 and an attached compressible foam cushion 151. A central bottom pan 150 is part of frame 149. Seat back 143 includes a generally rectangularly shaped back frame 153 and an attached compressible foam cushion 155. The frames are preferably made from stamped steel and the cushions are fabric, leather or vinyl covered. The frames also include internally spanning wire mesh or other cushion supporting componentry.

Recliner mechanism 145 includes a hinge 157 on each side that has a generally inverted U-shape with a pivot 159 coupled to back frame 153 and an opposite leg 161 stationarily affixed to bottom frame 149. An electric motor, cable drive and/or geared actuator 163 are coupled to the pivot to automatically control tilting or reclining of recliner mechanism 145. Alternately, reclining can be manually controlled by lever and nut-to-jack screw actuation.

Seat 31 further includes a lumbar support 181 which is slidably coupled to back frame 153 by elongated rods 180. An electric motor and cable actuator 184 moves lumbar support 181. A generally straight link 183 has a slotted pin and lost motion coupling 186 which pivotally connects a flange on each side of seat back frame 153 to a flange upwardly extending from bottom pan 150. Link 183 pulls the rear of pan 150 in an upward direction while seat back 143 is reclining. Pan 150 is pivoted at a front attachment to bottom frame 149 adjacent where bottom frame 149 attaches to seat tracks 147. Thus, lumbar support 181 is maintained a somewhat constant distance relative to the seat bottom regardless of the seat back positioning. Link 183 may be alternately replaced by a cable. Moreover, seat track mechanism 147 includes elongated seat tracks mounted to the vehicle floor which allow linear movement, front and back links allowing up/down and tilting movement, and electric motor actuators.

Figure 9:
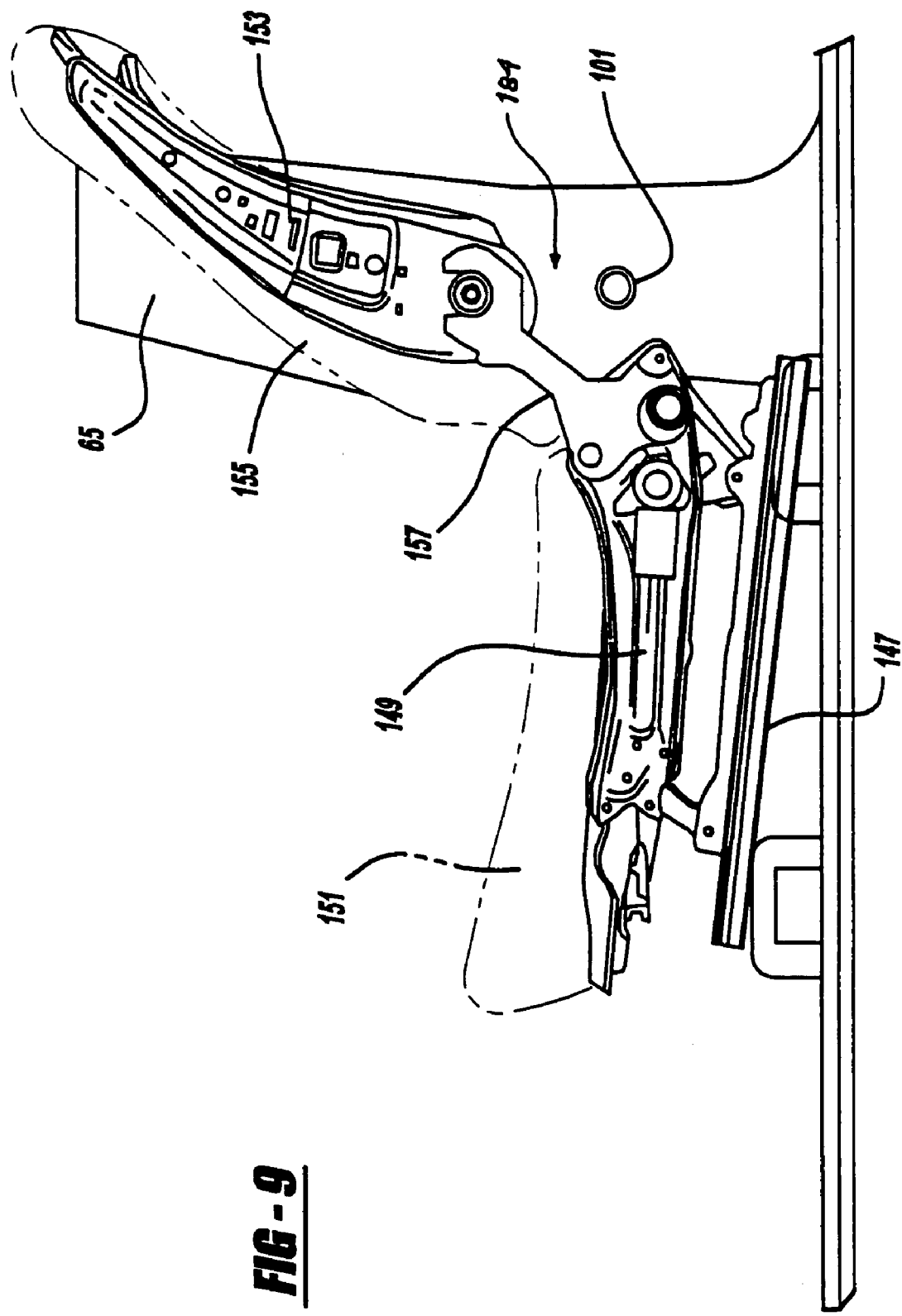
FIG. 9 is a side elevational view showing the preferred embodiment system, with the seat in a fully raised position.
Figure 10:
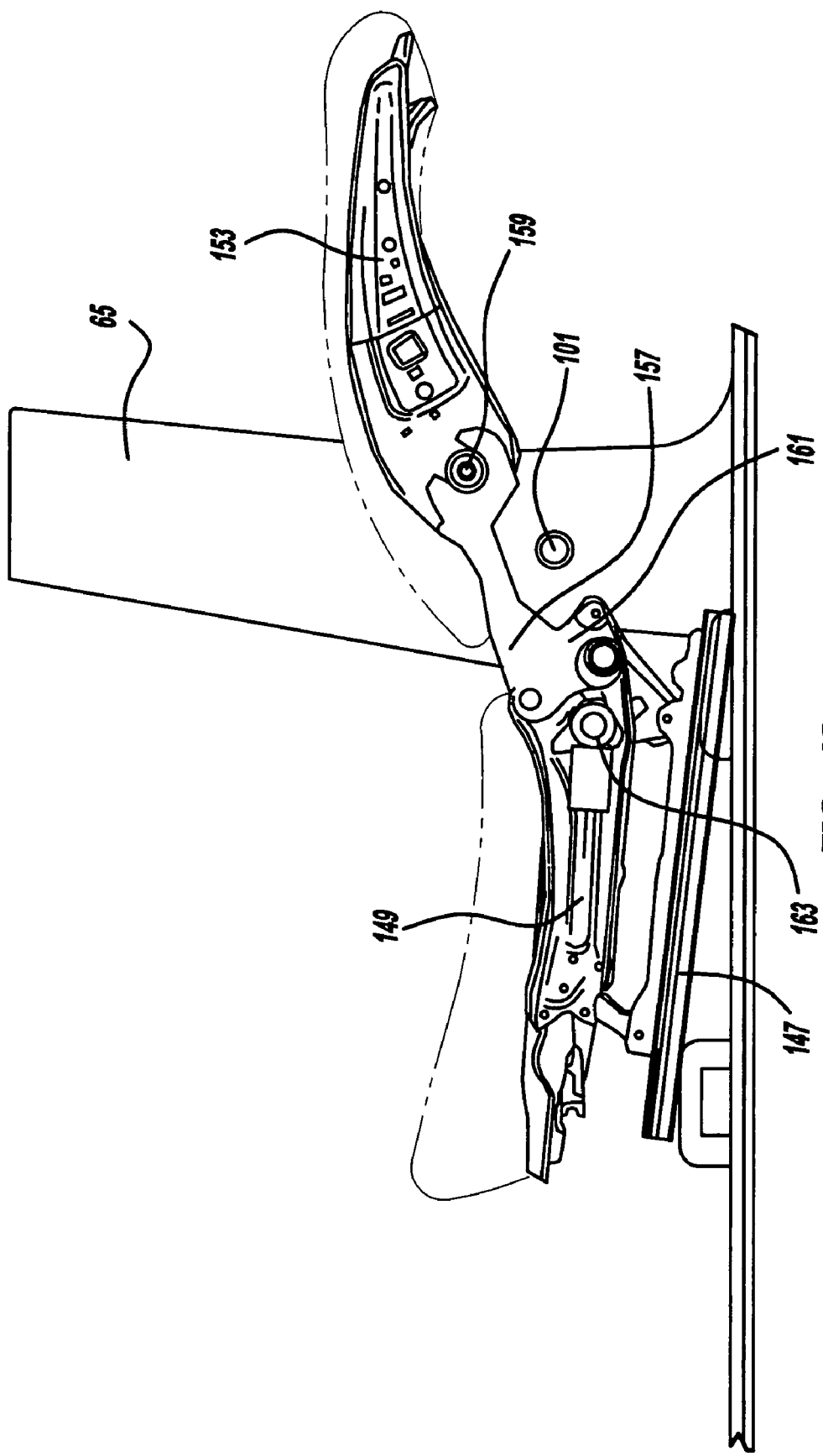
FIG. 10 is a side elevational view showing the preferred embodiment system, with the seat in a fully reclined position.
Figure 11:
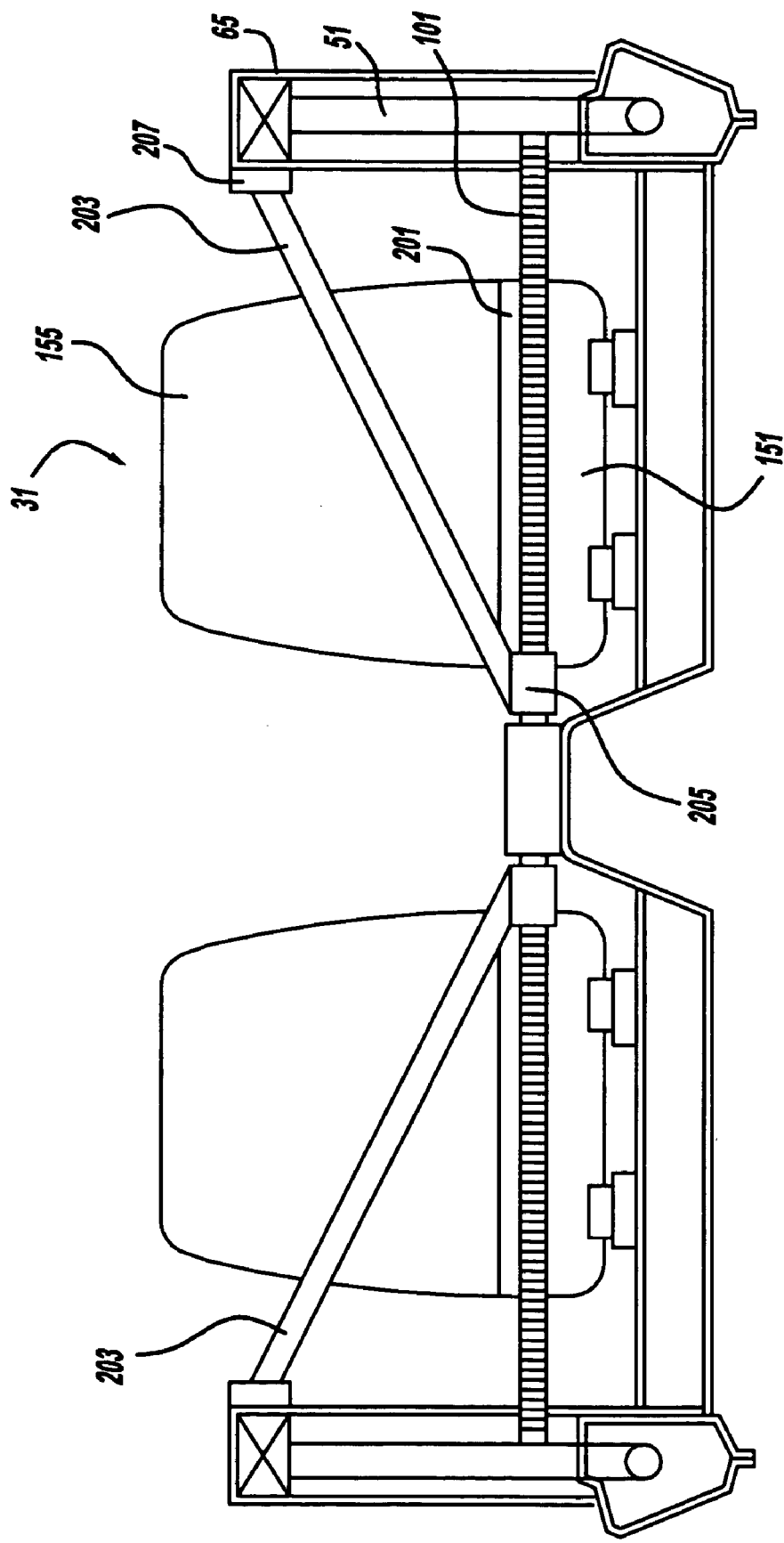
FIG. 11 is a diagrammatic rear view, like that of FIG. 3, showing a first alternate embodiment of the present invention system.
Figure 12:
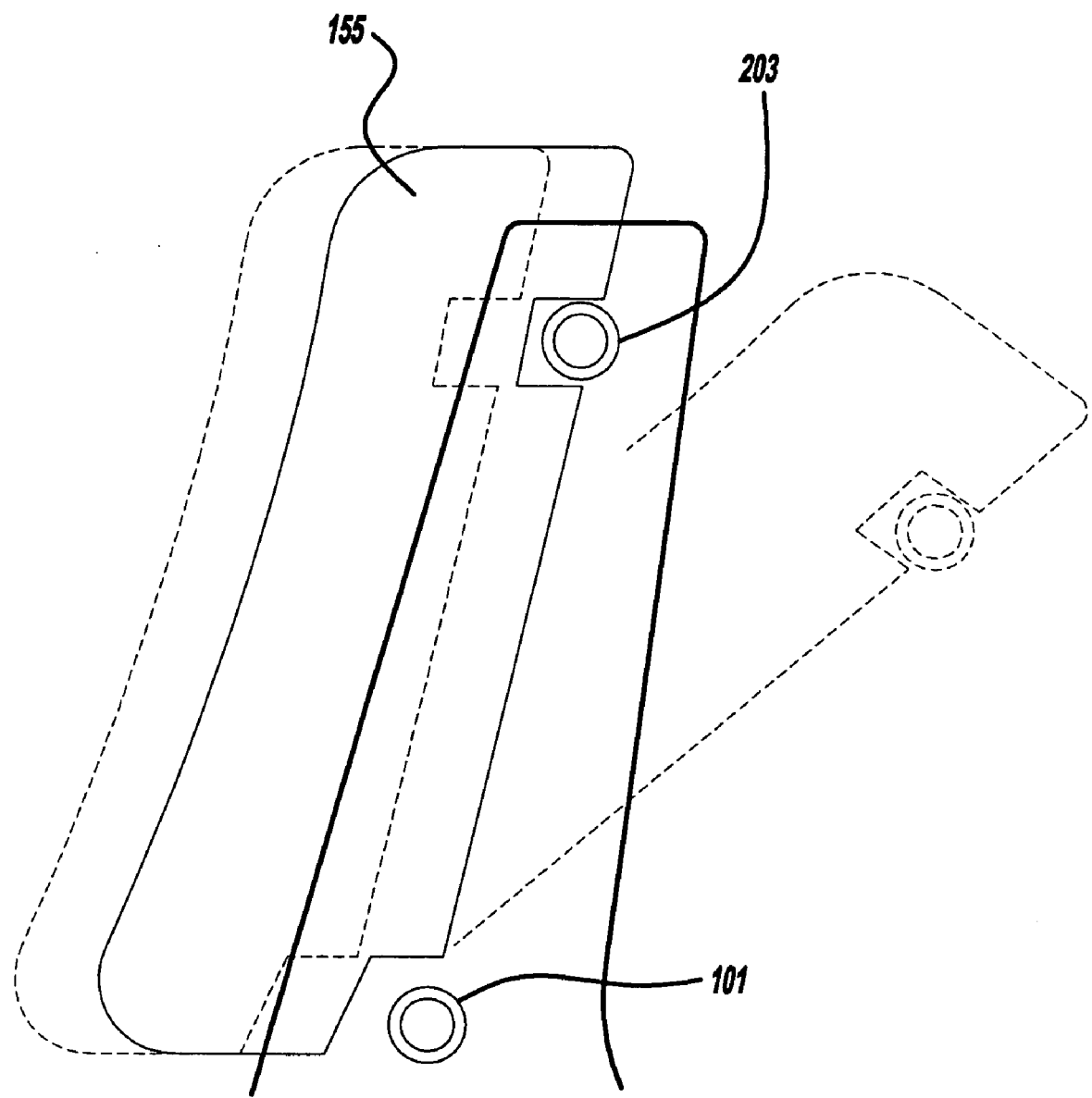
FIG. 12 is a diagrammatic side view showing the first alternate embodiment system.
Figure 13:
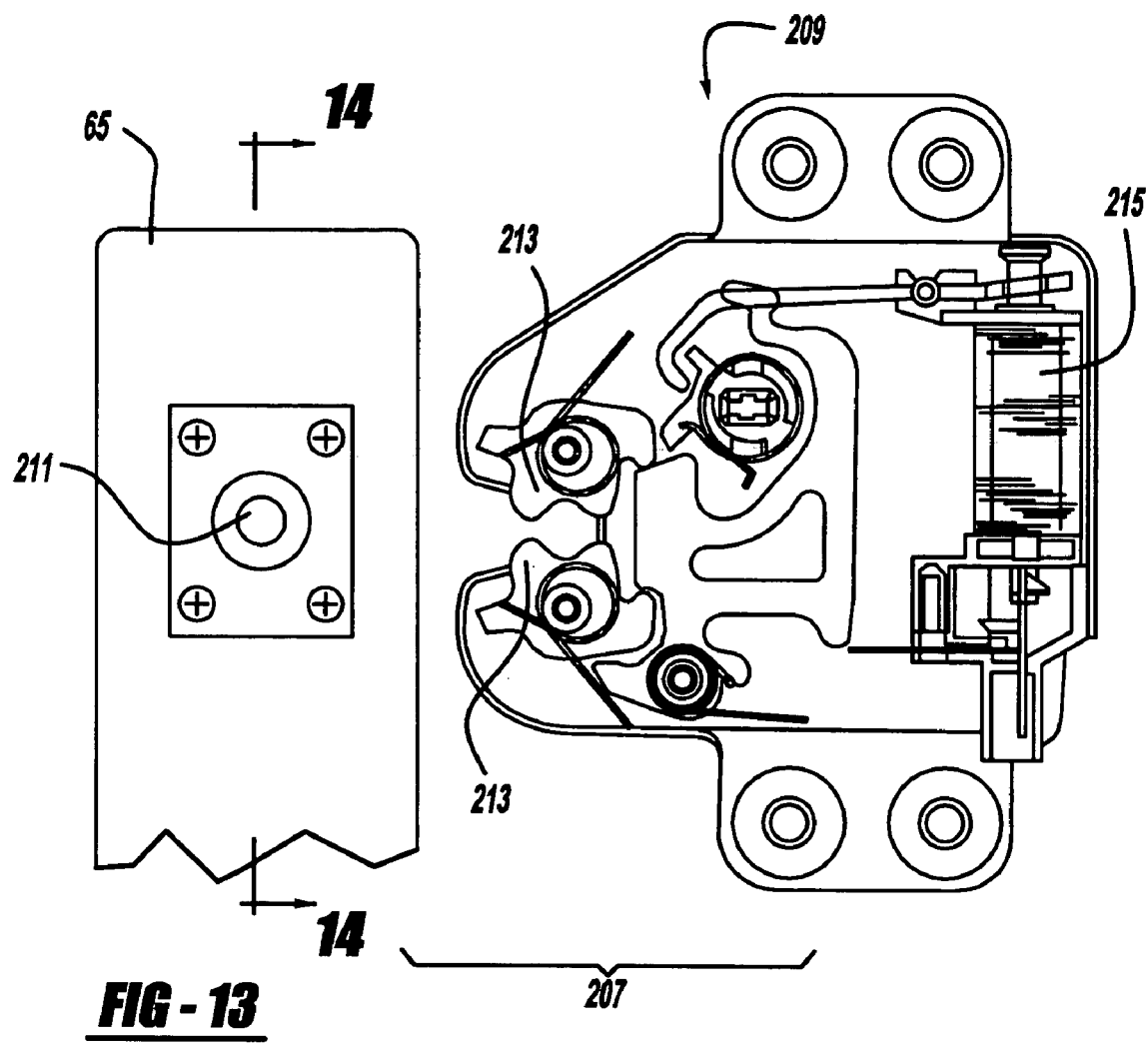
FIG. 13 is a fragmented side view showing a locking mechanism employed in the first alternate embodiment system.
Figure 14:
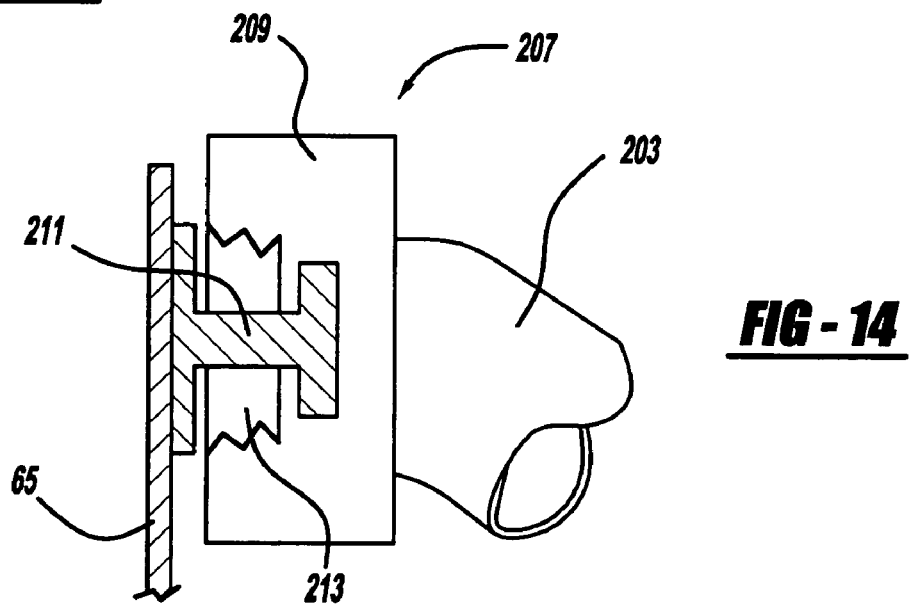
FIG. 14 is a partially fragmented rear view showing the locking mechanism employed in the first alternate embodiment system.

Accordingly, there is a recess in hinge 157 and matching offset and recess 184 in seat cushions adjacent the lower, rear intersection of seat back 143 and seat bottom 141. In operation, this allows for normal rearward, linear placement of the seat without interfering with beam 101, as shown in FIG. 9. This configuration also allows for generally flat folding or reclining of seat back 143 above beam 101 from the upright position of FIG. 9 to the fully reclined position of FIG. 10 (here shown within 20° of horizontal). Thus, beam 101 is received within the recess of hinge 157 and of seat cushions 151 and 155. In contrast, traditional seat constructions would create an undesirable interference between a reclined seat back and the floor-to-beam spacing of the present invention.

FIGS. 11-14 illustrate a first alternate embodiment wherein the structural seat system includes a main crosscar beam 101 coupled to and spanning between B-pillars 65. Main beam 101 is received within recesses 201 of both front passenger seats 31 like that of the preferred embodiment. A supplemental, structural beam or reinforcement 203 diagonally extends in an upward and outward direction from each side of main beam 101. An inboard end of each diagonal beam 203 has a collar 205 that rotatably couples diagonal beam 203 to the stationary main beam 101.

A locking mechanism 207 disengagably couples an outboard end 209 of each diagonal beam 203 to B-pillar 65. Each locking mechanism 207 has a latching device 209 and a striker 211. Latching device includes a pair of rotatable latches 213 driven by an electromagnetic solenoid 215, which in turn, is automatically actuated when the seat back reclining mechanism is actuated. Latches 213 lock around striker 211 when the seat back is located in a nominal and generally upright position, and disengage from the striker when the seat back is rearwardly tilted or the seat bottom is linearly moved from a nominal position. Lost motion slots and pins can be employed to allow some predetermined range of linear and reclining motion without the need for locking mechanism disengagement. Latching device 209 is shown attached to diagonal beam 203 and striker 211 is shown attached to B-pillar 65, however, this arrangement may be reversed. Diagonal beam 203 is slidably attached to seat back 155 in a manner to allow normal seat back movement in concert with diagonal beam 203, such as with straps, slotted brackets or the like. The majority of diagonal beam 203 is external to the normal seat back frame and cushion yet the diagonal beam resists side impact crushing if the seat back is fully reclined.

Figure 15:
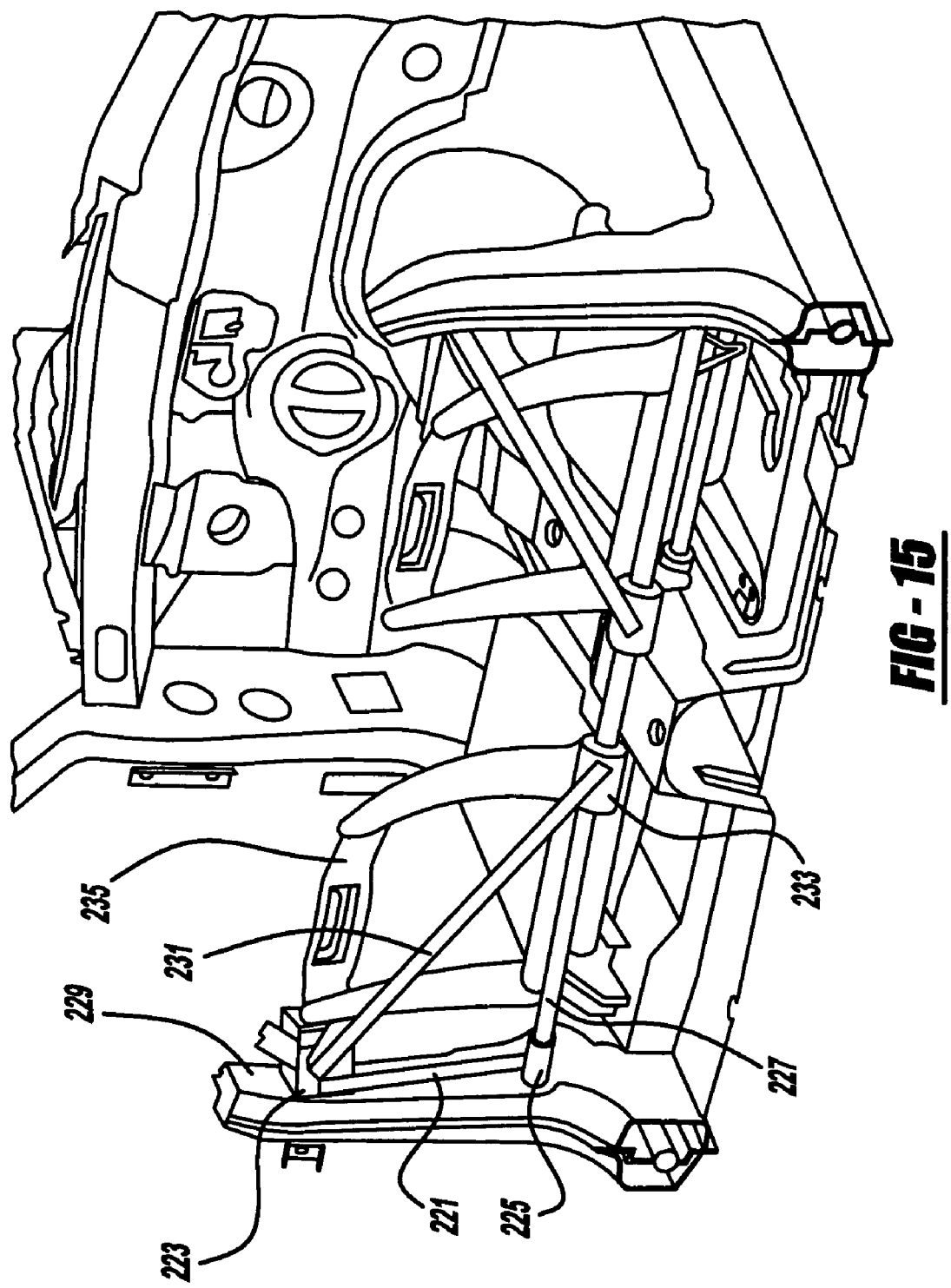
FIG. 15 is a rear perspective view showing a second alternate embodiment of the present invention system.

Reference should now be made to FIG. 15. This second alternate embodiment system is much like that shown in FIG. 11, except that a distal end of a generally vertically elongated, tubular beam 221 is attached to a housing of a locking mechanism 223 and a proximal end has a collar 225 rotatably coupled to an outboard end of a main cross beam 227 adjacent a B-pillar 229. A diagonal, tubular beam 231 extends between locking mechanism 223 and a rotatable collar 233 coupled to main beam 227. In this embodiment, both vertical and diagonal beams 221 and 231, respectively, are allowed to rotate with a seat back frame 235.

Figure 16:
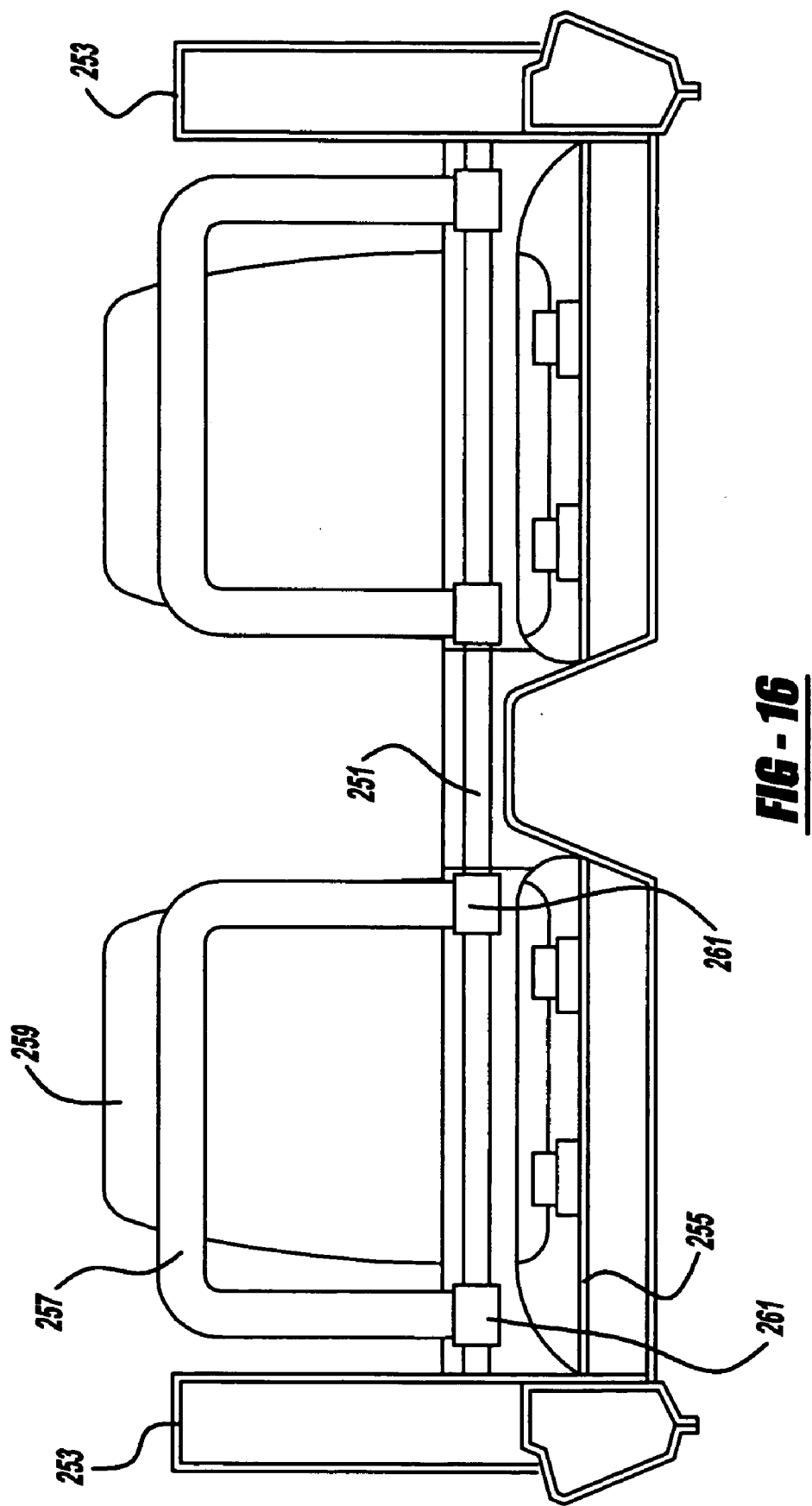
FIG. 16 is a diagrammatic rear view, like that of FIG. 3, showing a third alternate embodiment of the present invention system.

Referring to a third alternate embodiment of FIG. 16, a main cross beam 251 spans between B-pillars 253 above a vehicular floor 255. An inverted, generally U-shaped, supplemental beam 257 is coupled to each front passenger seat back 259 for corresponding tilting movement. Each supplemental beam 257 included two generally vertical and tubular legs rotatably coupled to main beam 251 by collars 261 and a tubular upper leg which extends between the vertical legs in a generally horizontal and cross-vehicle direction.

Figure 17:
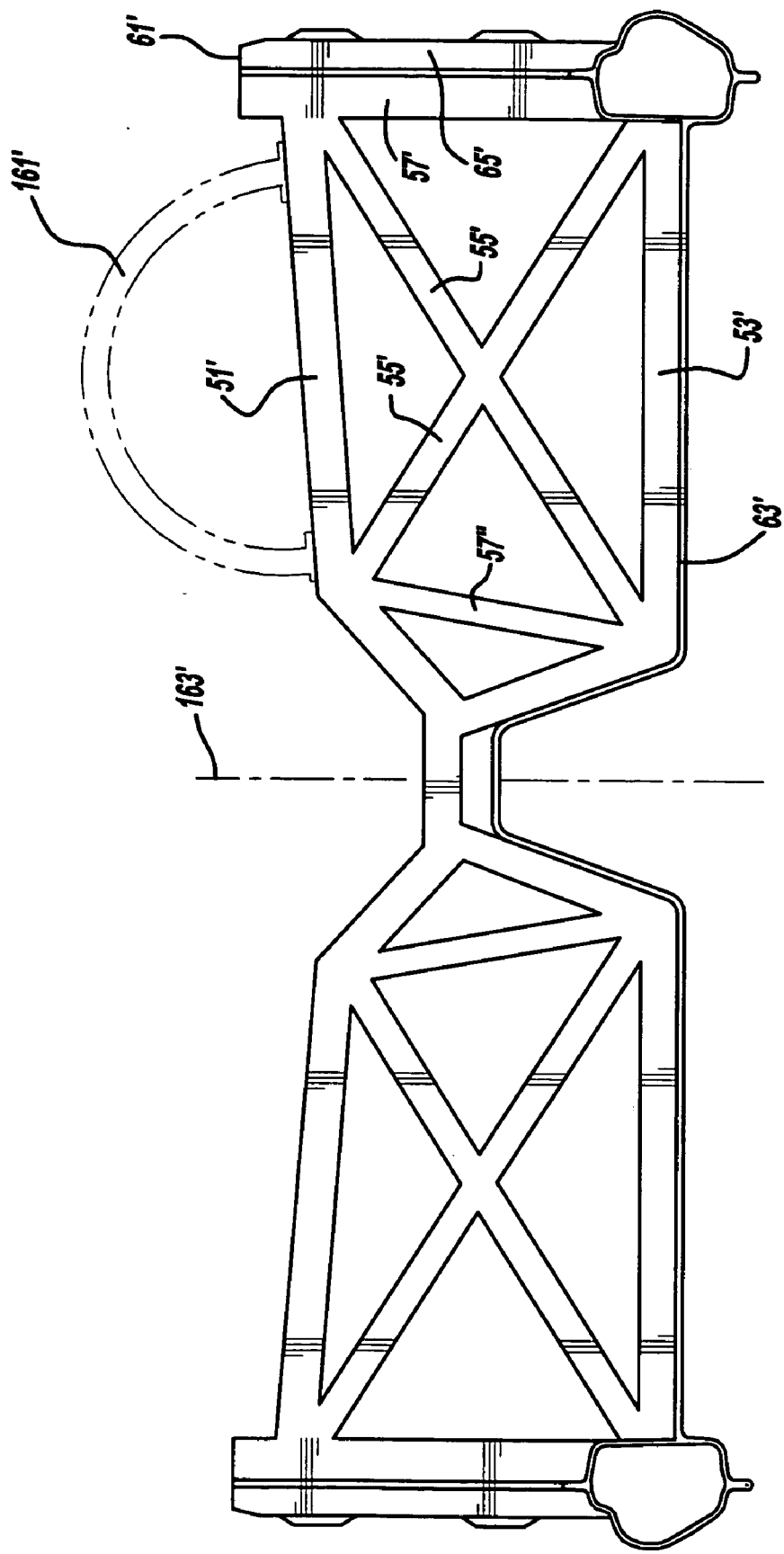
FIG. 17 is a partially fragmentary, diagrammatic rear view, similar to that of FIG. 3, showing an alternate variation of the present invention system.

If raised above the seat backs, the supplemental beams may optionally serve as vehicle roll bars secured to the main beam on each side of the vehicle's fore-and-aft centerline. A pendulum activated locking mechanism, as with conventional seat belt retractors, may be employed to fix the otherwise rotatable collars 261 to the main beam in the event of a rollover and/or side impact condition. An alternate variation is shown in FIG. 17 where roll bars 161' are optionally secured (in a fixed manner) to an upper beam 51' on each side of the vehicle's fore-and-aft centerline 163'. Upper beam 51' is positioned adjacent a beltline 61' of the vehicle (spaced above a vehicular floor), a lower beam 53' is attached to a sheet metal floor pan 63' of the vehicle, outboard vertical beams 57' are welded, riveted or otherwise secured to B-pillars 65' of the vehicle, and diagonal beams 55' and an inboard generally vertical beam 57" interconnect the other beams.

Figure 18:
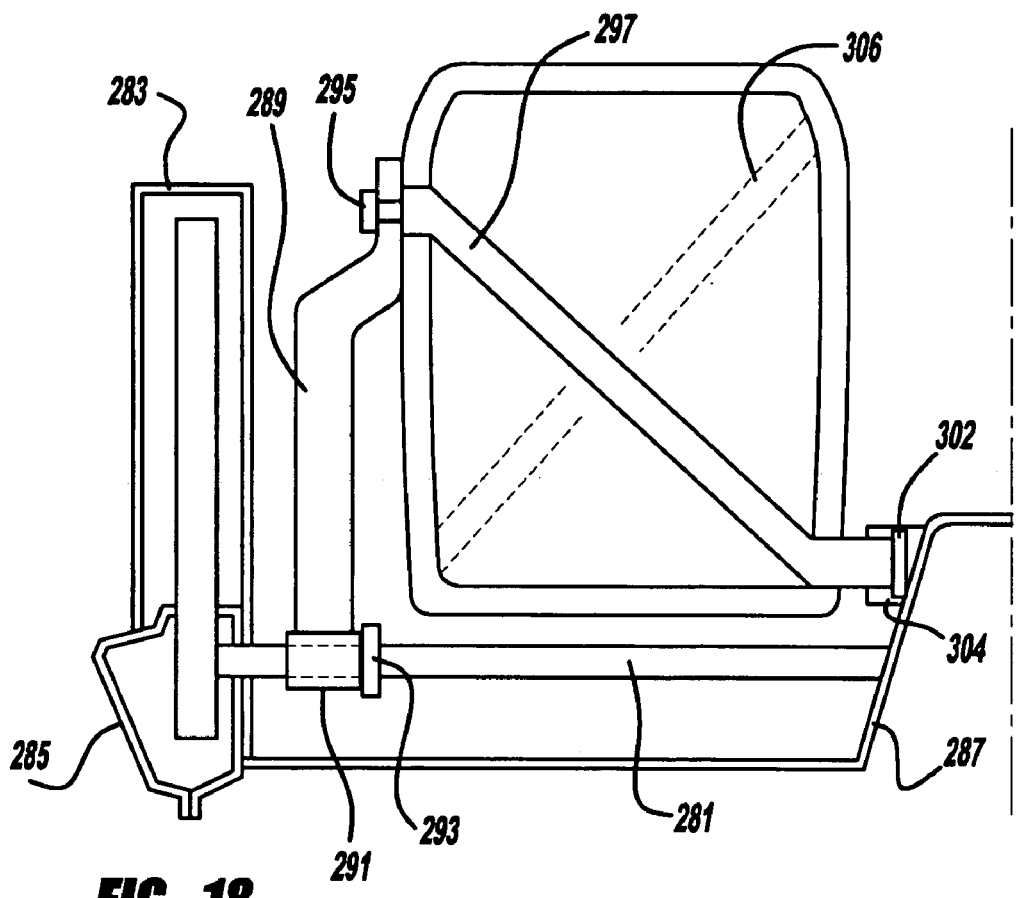
FIG. 18 is a diagrammatic rear view showing a fourth alternate embodiment of the present invention system.
Figure 19:
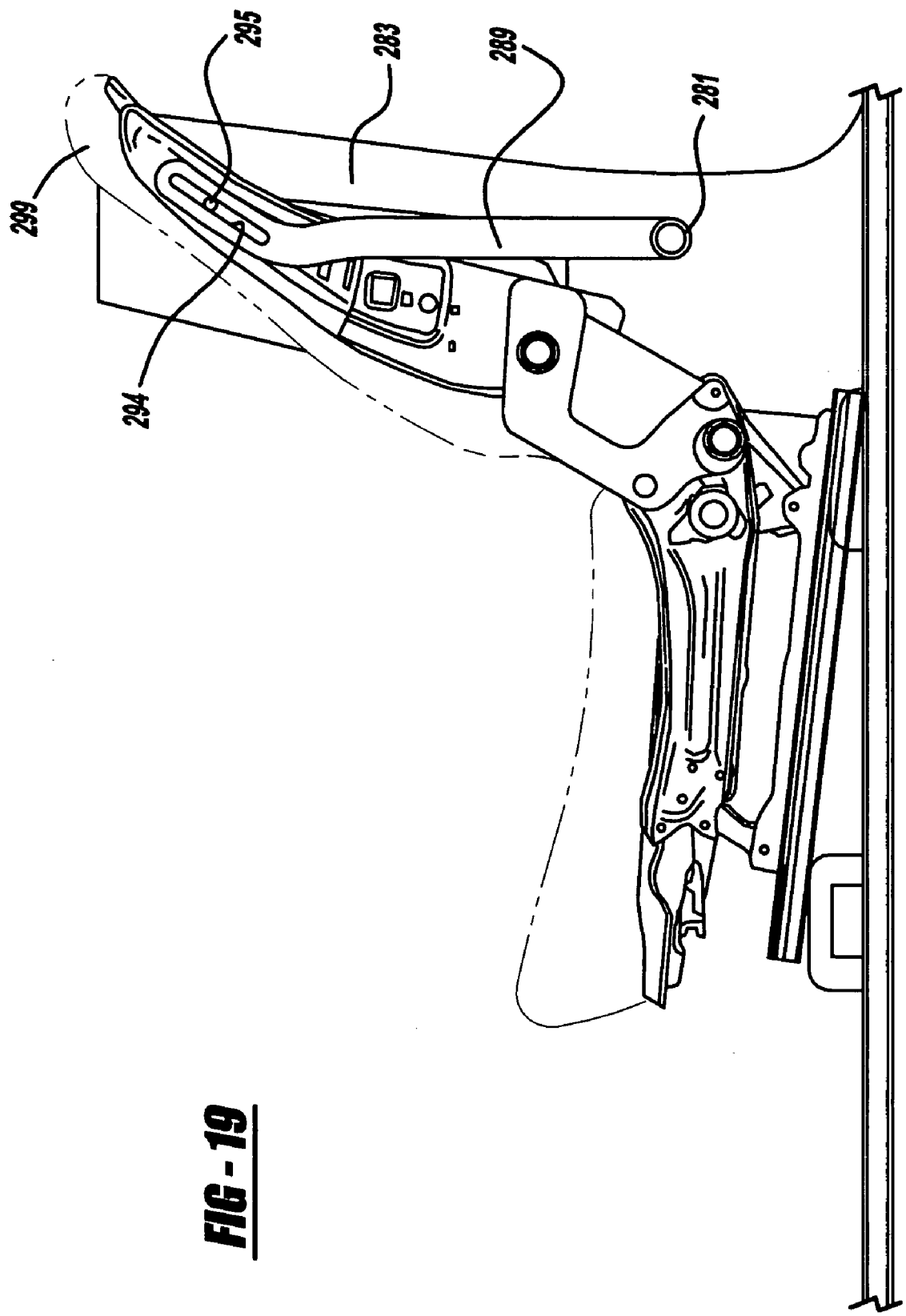
FIG. 19 is a side elevational view showing the fourth alternate embodiment of the present invention system.

FIGS. 18 and 19 illustrate a fourth alternate embodiment system. A main, cross-vehicle elongated, tubular beam 281 extends from one B-pillar 283 and rocker panel 285, projects through a center tunnel 287, and is coupled to the opposite B-pillar and rocker panel. A generally vertical and tubular beam 289 is rotatably coupled to an outboard section of main beam 281 by a collar 291 which abuts against an inboard stop 293 affixed to the stationary main beam. An elongated slot 294 in an offset end of vertical beam 289 is coupled to a pin 295 outwardly projecting from a diagonal tubular beam 297 in a lost motion manner. Diagonal beam 297 may be either disposed internal or external to seat back cushion 299, but is coupled to the seat back for coincidental tilting movement. An inboard end of diagonal beam 297 has an abutment structure 302 received within a journaling bracket 304 joined to center tunnel 287. Thus, a side impact collision against the diagonal beam and the vertical beam will be resisted by the main beam and by the abutment structure-to-tunnel interface. Yet, the passenger is still protected when the seat back is reclined or otherwise moved behind the B-pillar. A crossing second, diagonal beam 306 is optionally coupled to the first diagonal beam 297, a seat back frame, one or more vertical beams 289 and/or main beam 281.

Figure 20:
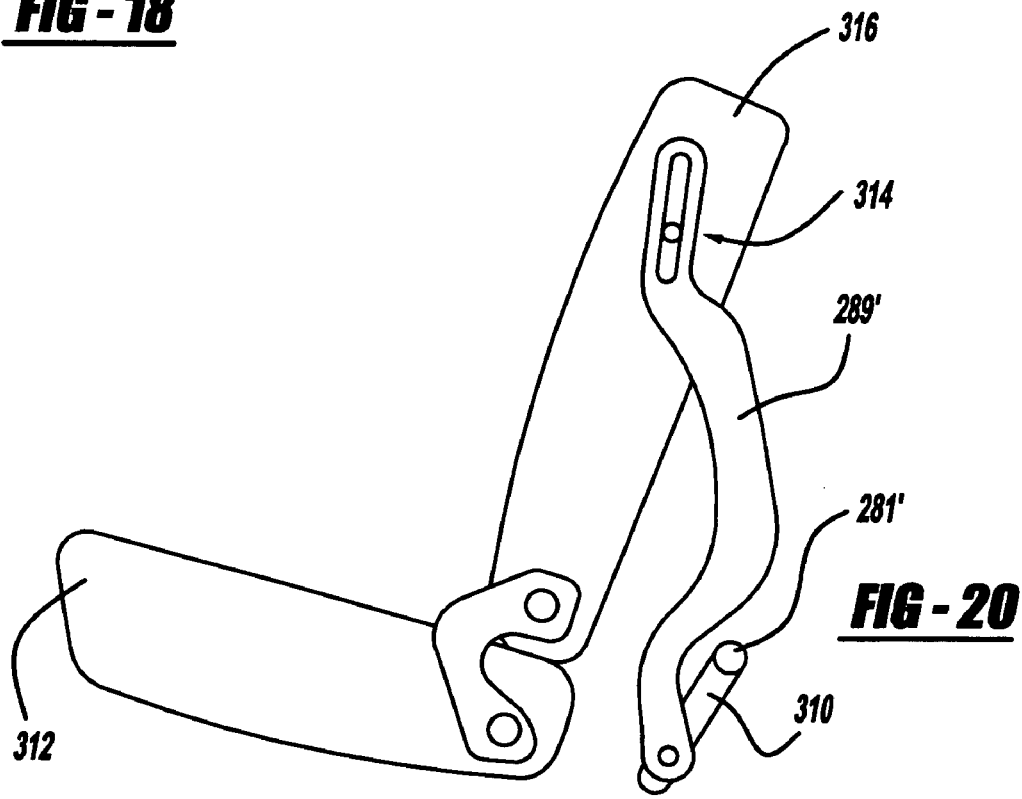
FIG. 20 is a diagrammatic side view showing a fifth alternate embodiment of the present invention system.

FIG. 20 shows a fifth alternate embodiment system like that of FIG. 18 but where an extra link 310 couples a curving vertical beam 289' to a main cross beam 281'. This more easily allows fore-and-aft and tilting movement of a seat bottom 312, while a lost motion coupling 314 allows reclining of a seat back 316 relative to seat bottom 312 and main beam 281' which is stationary relative to the vehicle.

Figure 21:
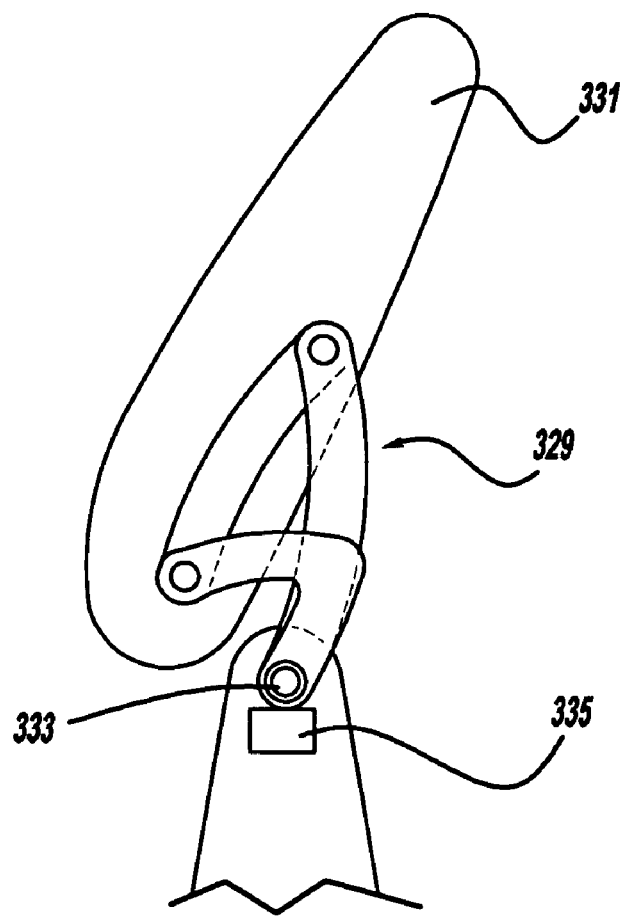
FIG. 21 is a diagrammatic side view showing a sixth alternate embodiment of the present invention system.
Figure 22:
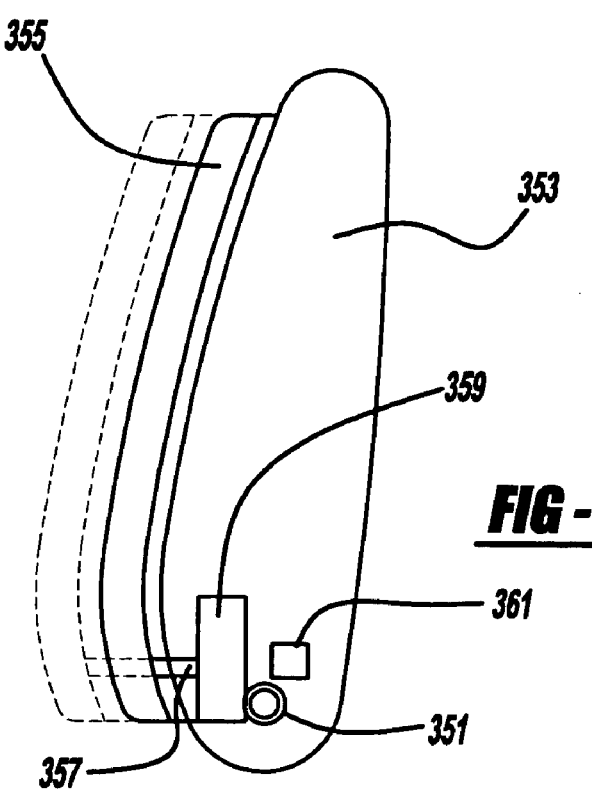
FIG. 22 is a diagrammatic side view showing a seventh alternate embodiment of the present invention system.

A sixth alternate embodiment is shown in FIG. 21. This system provides a multi-link coupling 329 between a front passenger seat back 331 and an external, structural cross beam 333 extending between the B-pillars. An electric motor or manual lever actuator 335 drives the reclining and/or fore-aft motion of seat back 331 relative to beam 333 by way of a sector gear or cable connection to the links. The seventh alternate embodiment of FIG. 22 illustrates a structural cross beam 351 located internally within a front passenger seat back 353, with ends of the cross beam protruding externally inboard and outboard of the seat. A supplemental seat back cushion and support 355 (such as a rigid polymeric sheet) is coupled to seat back 353 by way of links or tracks 357 and is linearly moved away from seat back 353 through activation of an internal electric motor actuator 359 driving cables or the like. A second internal electric motor actuator 361 serves to rotate seat back 353 about beam 351 by way of a geared coupling or the like.

Figure 23:
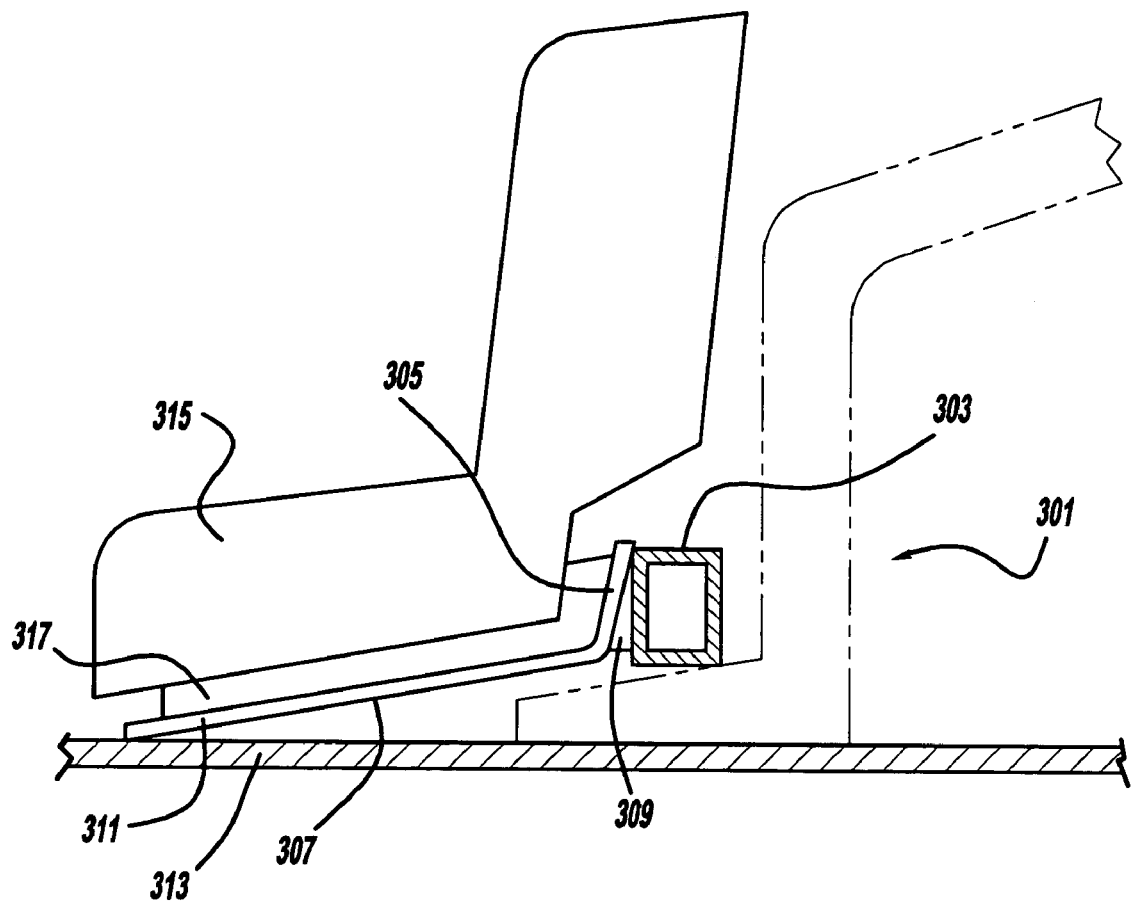
FIG. 23 is a partially fragmentary, diagrammatic side view showing an eighth alternate embodiment of the present invention system.

FIG. 23 illustrates an eighth alternate embodiment structural reinforcement system 301 of the present invention. In this embodiment, a structural beam 303 extends in a generally straight (when viewed from the top and rear) orientation between the B-pillars or other upstanding structural members of the automotive vehicle adjacent the rocker panels. Beam 303 is an enclosed and hollow polygon, here shown with four sides when viewed in cross-section, which can be extruded or hydroformed from steel. Rear sections 305 of metal seat tracks 307 are attached to beam 303 by welded or riveted brackets 309. Front sections 311 of seat tracks 307 are attached to a metal floor panel 313 by welded, riveted or bolted on brackets. Front seats 315, or other passenger seats, and their respective seat movement mechanisms 317 are attached to seat tracks 307. Exemplary seat movement mechanisms 317 are disclosed in U.S. Pat. No. 5,575,531 entitled "Vehicle Power Seat Adjuster with End Driven Lead Screw Actuation" which issued to Gauger, et al. on Nov. 19, 1996, and is incorporated by reference herein. Space is provided below beam 303 and the adjacent portion of seat tracks 307 so as to maximize passenger compartment leg room and foot room. Beam 303 is secured to the vehicle well below a beltline area but may be useful in trucks, vans, sport utility vehicles and other situations that serve to add the required vibrational stiffness, minimize cross-vehicle and diagonal twisting of the vehicle body, while also improving crashworthiness during side impact. Thus, beam 303 advantageously serves as a multifunctional part.

Figure 24:
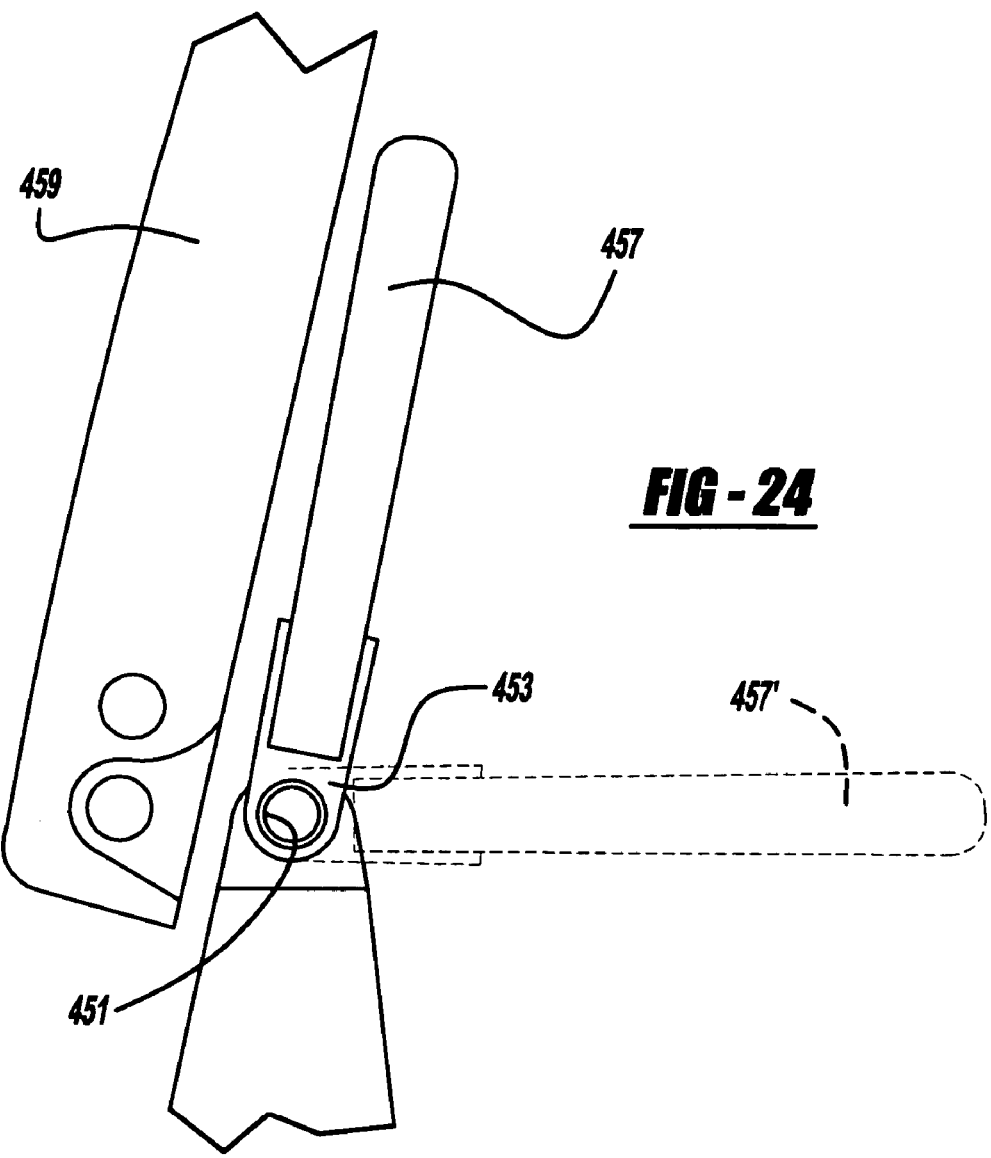
FIG. 24 is a diagrammatic side view showing a ninth alternate embodiment of the present invention system.
Figure 25:
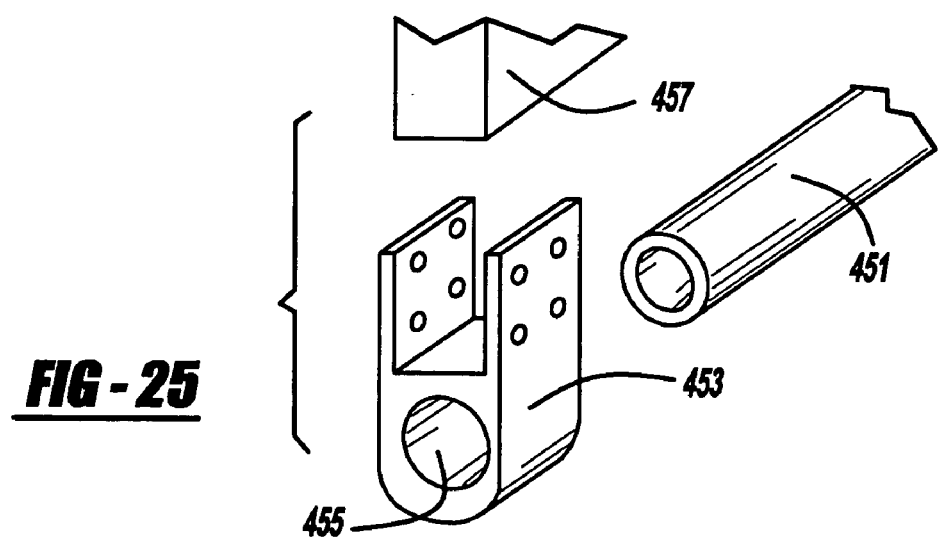
FIG. 25 is an exploded perspective view showing the ninth alternate embodiment system.

A ninth alternate embodiment system of the present invention can be seen by reference to FIGS. 24 and 25. This exemplary embodiment provides a structural beam 451, which projects between the vehicular B-pillars and is spaced above the vehicular floor. One or more sockets 453 have a through-bore 455 rotatably positioned about beam 451 such that the beam acts as a fixed pivot. A rigid, polymeric table 457 is attached to bifurcated fingers of socket 453 by screws or rivets. The movement force required of socket 453 relative to beam 451 can be controlled by variably moving a set screw projecting into bore 455, a slotted opening in the socket which is open to bore 455 and spanned by an adjustable bolt, a viscous geared dampener, or the like. Moreover, a latch can disengagably retain the table to the seat back. A seat back 459 can recline with table above beam 451 using the previously disclosed reclining mechanisms.

While various aspects of the structural seat system have been disclosed, it should be appreciated that variations may be made which fall within the scope of the present invention. For example, additional accessories can be attached to any of the structural reinforcement beams disclosed herein such as folding tables, lamps, telephones, computers and the like. Furthermore, the beams can alternately be manufactured from composite materials such as glass-filled polymers, metal inserts molded within polymers, and the like. The cross-vehicle beams and reinforcements can also be employed behind rear seats, in front of instrument panels or between other vehicle pillars although various advantageous of the present invention may not be fully achieved. The structural system is preferably employed in a convertible vehicle having four, side passenger doors but may also be used in a stretch limousine having four or more passenger doors and a stationary roof. Bullet-proof armor is optionally mounted along a cross-car plane parallel and internal to trim panels. Furthermore, it should be appreciated that alternate beam shapes can be employed. It is also envisioned that the seat-to-beam interface, recessed retraction mechanism, and seat configuration can be used for a multi-passenger bench seat and other seat shapes, although all of the advantages of the present invention may not be utilized. It is intended by the following claims to cover these and any other departures from the disclosed embodiments that fall within the true spirit of the invention.

The invention claimed is:

1. An automotive vehicle seat comprising:
   a seat back;
   a seat bottom;
   a seat movement mechanism coupled to the seat bottom;
   at least one of the seat back and seat bottom including a recessed configuration on a lower rear section thereof; and
   a structural member located in the recessed configuration and extending in a substantially horizontally elongated direction, the seat bottom being movable independently of the structural member.

2. The seat of claim 1 further comprising an elongated seat track coupled to the seat bottom by the movement mechanism.

3. The seat of claim 1 further comprising a pivot of the seat back relative to the seat bottom allows the seat back to recline above the recessed configuration.

4. The seat of claim 1 wherein the structural member extends in a cross-vehicle direction and is spaced above a vehicular floor.

5. The seat of claim 1 wherein the seat back operably reclines to a substantially horizontal position above the recessed configuration.

6. The seat of claim 1 wherein there is occupant foot space below the seat bottom.

7. An automotive vehicle seat comprising:
   a seat back;
   a seat bottom;
   a seat movement mechanism coupled to the seat bottom;
   at least one of the seat back and seat bottom including a recessed configuration on a lower rear section thereof; and
   a lumbar support and a member maintaining a desired distance between the lumbar support and a portion of the seat bottom even when the seat back and the lumbar support are reclined.

8. The seat of claim 7 further comprising a structural beam spaced above a vehicular floor and extending in a substantially horizontal and cross-vehicle direction, and a recess of a hinge at least partially surrounding the structural beam when the seat back is reclined above the structural beam.

9. An automotive vehicle seat comprising:
   a seat back;
   a seat bottom;
   a seat movement mechanism coupled to the seat bottom;
   at least one of the seat back and seat bottom including a recessed configuration on a lower rear section thereof; and
   a recliner hinge coupling the seat back to the seat bottom, the recliner hinge including a recess that corresponds to the recessed configuration of the at least one seat back and seat bottom.

10. The seat of claim 9 further comprising a structural member located in the recessed configuration and extending in a substantially horizontally elongated direction, the seat bottom being movable independently of the structural member.

11. An automotive vehicle seat comprising:
    a seat back;
    a seat bottom;
    a seat movement mechanism coupled to the seat bottom; and
    at least one of the seat back and seat bottom including a recessed configuration on a lower rear section thereof;
    wherein the seat bottom and seat back each include a rigid frame and a cushion, the seat bottom and seat back defining a front passenger seat movable in vertical, tilting and horizontal directions relative to the automotive vehicle.

12. An automotive vehicle seat system comprising:
a seat back;
a seat bottom;
a recliner hinge coupling the seat back to the seat bottom, the hinge having a rearwardly facing and substantially inverted U-shaped recess;
wherein the seat back is movable to a reclined position less than about 20 degrees from a horizontal plane substantially aligned with the seat bottom; and
a structural beam spaced above a vehicular floor and extending in a substantially horizontal and cross-vehicle direction, the recess of the hinge at least partially surrounding the structural beam when the seat back is reclined above the structural beam.

13. The seat system of claim 12 wherein the structural beam is coupled to the seat back, the beam resists a FMVSS 214 side impact collision, and the beam is spaced above a vehicular floor.

14. The seat system of claim 12 further comprising a lumbar support and a member maintaining a desired distance between the lumbar support and a portion of the seat bottom even when the seat back and the lumbar support are reclined.

15. The seat system of claim 12 further comprising:
a front passenger door opening;
a rear passenger door opening located on the same side of the vehicle as the front door opening; and
a convertible roof movable from a raised position above the door openings and the seat bottom, to a retracted position substantially below a vehicle beltline.

16. A method of manufacturing an automotive vehicle seat, the seat including a seat back, a seat bottom and a mechanism, the method comprising:
(a) coupling the seat back to the seat bottom with the mechanism;
(b) orienting an opening of the mechanism to face in a rearward direction;
(c) rotating the seat back relative to the seat bottom about a pivot located on an upper leg of the mechanism above the opening; and
(d) locating a recess in the seat, corresponding to the opening, adjacent a stationary and structural cross-vehicle elongated beam, the beam being located above a vehicular floor and extending at least a majority of the cross-vehicle width.

17. The method of claim 16 wherein the beam significantly assists in resisting a FMVSS 214 side impact collision.

18. The method of claim 16 further comprising a second beam located within the stationary beam, the second beam being elongated a majority of the cross-vehicle width.

19. The method of claim 16 further comprising coupling at least one link between the beam and the seat.

20. The method of claim 16 further comprising tilting, vertically moving and fore-and-aft moving the seat bottom with at least one energizable actuator, and installing a convertible roof to the vehicle which can be raised above the seat, and installing at least four doors onto the vehicle.

21. The method of claim 16 wherein the seat is a front seat with passenger foot room located below the seat bottom.

22. The method of claim 16 further comprising moving the seat bottom and seat back independently of the beam.

23. A method of manufacturing an automotive vehicle seat, the seat including a seat back, a seat bottom and a mechanism, the method comprising:
(a) coupling the seat back to the seat bottom with the mechanism:
(b) orienting an opening of the mechanism to face in a rearward direction;
(c) rotating the seat back relative to the seat bottom about a pivot located on an upper leg of the mechanism above the opening; and
(d) maintaining a lumbar support at a distance relative to the seat bottom even during reclining of the seat back.

* * * * *